US011864208B2

(12) United States Patent
Kwak et al.

(10) Patent No.: US 11,864,208 B2
(45) Date of Patent: Jan. 2, 2024

(54) CONTROL RESOURCE SET (CORESET) ALLOCATION FOR REDUCED BANDWIDTH DEVICES IN 5G-NR

(71) Applicant: QUALCOMM Incorporated, San Diego, CA (US)

(72) Inventors: Yongjun Kwak, San Diego, CA (US); Hung Dinh Ly, San Diego, CA (US); Jing Lei, San Diego, CA (US); Yuchul Kim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/357,635

(22) Filed: Jun. 24, 2021

(65) Prior Publication Data

US 2022/0417904 A1  Dec. 29, 2022

(51) Int. Cl.
*H04W 72/30* (2023.01)
*H04W 72/23* (2023.01)
(Continued)

(52) U.S. Cl.
CPC ......... *H04W 72/30* (2023.01); *H04W 56/001* (2013.01); *H04W 72/23* (2023.01); *H04W 72/044* (2013.01); *H04W 84/042* (2013.01)

(58) Field of Classification Search
CPC ... H04W 72/30; H04W 72/23; H04W 56/001; H04W 72/044; H04W 84/042
See application file for complete search history.

(56) References Cited

U.S. PATENT DOCUMENTS

2020/0022119 A1\* 1/2020 Wang ..................... H04W 72/12
2020/0092866 A1\* 3/2020 Xue ....................... H04L 5/0053
(Continued)

OTHER PUBLICATIONS

CATT: "On RedCap Enhancements in Rel-18", 3GPP TSG RAN Rel-18 Workshop, RWS-210409, 3rd Generation Partnership Project, Mobile Competence Centre, 650, Route Des Lucioles, F-06921 Sophia-Antipolis Cedex, France, vol. TSG RAN, No. Electronic Meeting, Jun. 28, 2021-Jul. 2, 2021, 8 Pages, Jun. 7, 2021, XP052025962, the whole document.
(Continued)

*Primary Examiner* — Dominic E Rego
(74) *Attorney, Agent, or Firm* — Norton Rose Fulbright US LLP

(57) ABSTRACT

This disclosure provides systems, methods, and devices for wireless communication that support reduced bandwidth devices and particularly, allocation of control resource sets for reduced bandwidths. In a first aspect, a method of wireless communication includes receiving, from a base station at a user equipment (UE) having a first type, a master information block (MIB) within a physical broadcast channel (PBCH). The MIB includes CORESET size information and search space information for devices having a second type. The method also includes selecting a CORESET size from a plurality of preconfigured CORESET sizes based on a subcarrier spacing used to communicate with the base station. The method further includes monitoring a set of time and frequency resources to receive a message from the base station. The set of time and frequency resources has the selected CORESET size. Other aspects and features are also claimed and described.

30 Claims, 10 Drawing Sheets

(51) Int. Cl.
  *H04W 72/044*  (2023.01)
  *H04W 56/00*   (2009.01)
  *H04W 84/04*   (2009.01)

(56) References Cited

U.S. PATENT DOCUMENTS

| | | | |
|---|---|---|---|
| 2020/0128585 A1* | 4/2020 | Kuang | H04W 8/22 |
| 2020/0187236 A1* | 6/2020 | Moon | H04L 1/00 |
| 2020/0213960 A1* | 7/2020 | Jung | H04L 1/00 |
| 2020/0228966 A1 | 7/2020 | Xu et al. | |
| 2021/0007066 A1 | 1/2021 | Lin et al. | |
| 2021/0235420 A1* | 7/2021 | Kim | H04L 5/0091 |
| 2021/0298029 A1* | 9/2021 | Liu | H04W 72/0453 |
| 2021/0367731 A1* | 11/2021 | Hua | H04W 72/044 |
| 2021/0409244 A1* | 12/2021 | Taherzadeh Boroujeni | H04L 25/0204 |
| 2022/0015139 A1* | 1/2022 | Kim | H04L 5/00 |
| 2022/0272691 A1* | 8/2022 | Taherzadeh Boroujeni | H04W 72/23 |
| 2023/0345548 A1* | 10/2023 | Kuang | H04L 5/0053 |

OTHER PUBLICATIONS

FUTUREWEI: "Bandwidth Reduction for RedCap UEs", 3GPP TSG RAN WG1#104b-e, R1-2102778, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 10 Pages, Apr. 6, 2021, XP052177291, section 2.1.1.
International Search Report and Written Opinion—PCT/US2022/072849—ISA/EPO—dated Sep. 28, 2022.

* cited by examiner

Master Information Block (MIB)/Physical Broadcast Channel (PBCH) Format

| Layer Including Information | Information Field Name | # of Bits |
|---|---|---|
| L1 | LSB SFN | 4 |
|  | Half Radio Frame | 1 |
|  | MSB SSB Index | - |
|  | MSB SSB Freq-Offset | 1 |
|  | Reserved | 2 |
| L2 | MSB SFN | 6 |
|  | Subcarrier Spacing Indication | 1 |
|  | SSB Freq-Offset | 4 |
|  | DMRS Type A Position | 1 |
|  | PDCCH-ConfigSIB1 | 8 |
|  | Cell Barred | 1 |
|  | Intra-Frequency Reselection | 1 |
|  | Spare/Reserved | 1 |

FIG. 3

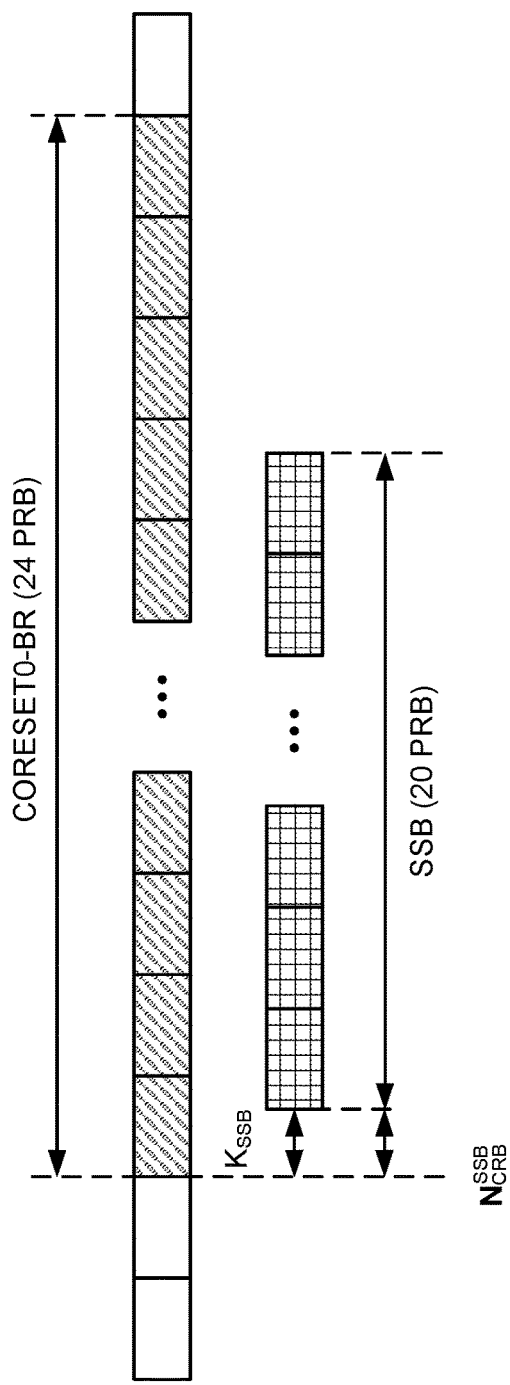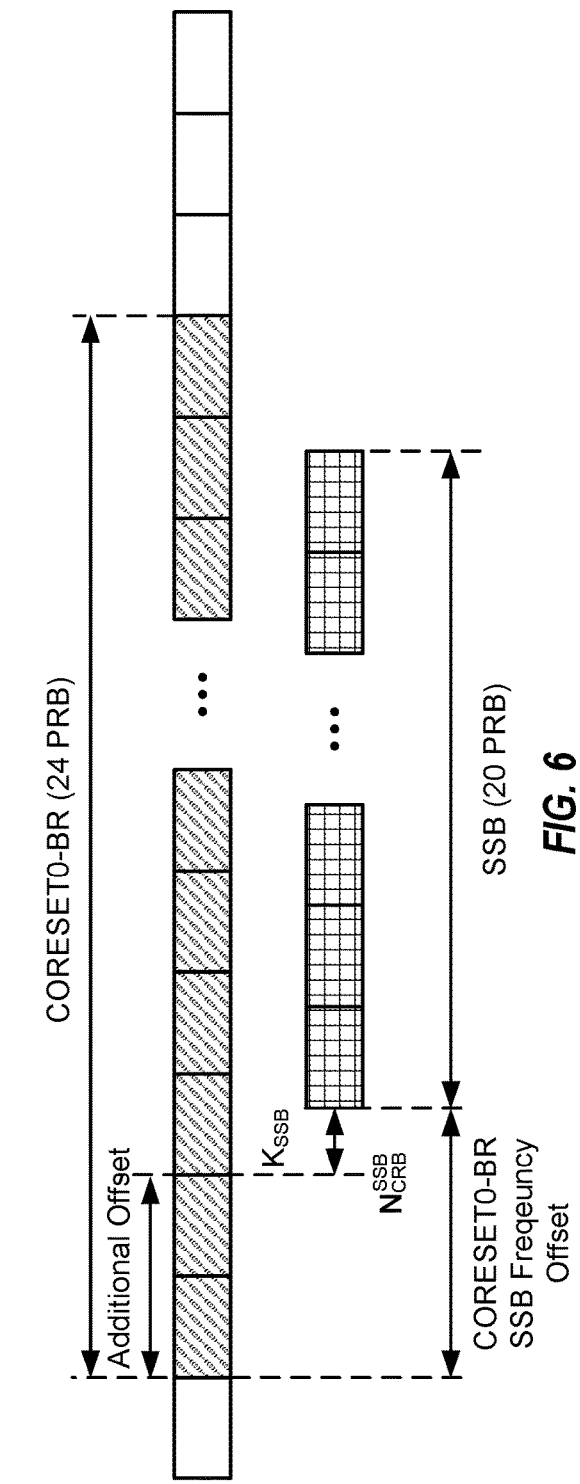

CONTROL RESOURCE SET (CORESET) ALLOCATION FOR REDUCED BANDWIDTH DEVICES IN 5G-NR

TECHNICAL FIELD

Aspects of the present disclosure relate generally to wireless communication systems, and more particularly, to systems that support reduced bandwidth devices, such as devices that support 20 megahertz (20 MHz) or less bandwidth. Some features may enable and provide improved communications, including allocation of resources for control resource sets (CORESETs), particularly CORESET0, for reduced bandwidth operation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

5th generation new radio (5G-NR) wireless communication provide improved quality communications and enhanced features through the use of higher bandwidths, such as the "millimeter wave" bandwidth. Although such improvements have been implemented in smartphones and other devices, some of the benefits of the technology have not been extended to less complex devices. To illustrate, research into supporting 5G-NR concepts in "reduced capabilities" (RedCap) devices, "NR-light" devices, and "NR-superlight" devices is progressing. Such research focuses on relaxing peak throughput, latency, and reliability requirements associated with typical 5G-NR to extend the benefits to devices with less complex processors and smaller battery lifetimes, such as wireless sensors, metering devices, asset tracking devices, and personal Internet-of-Things (IoT) devices, as non-limiting examples. Research goals include supporting low power wide area (LPWA) networks and devices via improvements in coverage, complexity, and power consumption, in addition to utilization of low-power and low-complexity sidelink communications. One focus of NR-superlight device research is to support devices that communicate via reduced bandwidths, such as bandwidths of 20 megahertz (MHz) or less. However, such reduced bandwidth operation may cause problems when attempting to support 5G-NR functionality, which is designed for larger bandwidth operation.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving, from a base station at a user equipment (UE) having a first type, a master information block (MIB) within a physical broadcast channel (PBCH). The MIB includes control resource set (CORESET) size information and search space information for devices having a second type. The method also includes selecting a CORESET size from a plurality of preconfigured CORESET sizes based on a subcarrier spacing used to communicate with the base station. The method further includes monitoring a set of time and frequency resources to receive a message from the base station. The set of time and frequency resources have the selected CORESET size.

In an additional aspect of the disclosure, an apparatus includes at least one processor and a memory coupled to the at least one processor. The at least one processor is configured to receive, from a base station at a UE having a first type, a MIB within a PBCH. The MIB includes CORESET size information and search space information for devices having a second type. The at least one processor is also configured to select a CORESET size from a plurality of preconfigured CORESET sizes based on a subcarrier spacing used to communicate with the base station. The at least one processor is further configured to monitor a set of time and frequency resources to receive a message from the base station. The set of time and frequency resources have the selected CORESET size.

In an additional aspect of the disclosure, an apparatus includes means for receiving, from a base station having at a UE having a first type, a MIB within a PBCH. The MIB includes CORESET size information and search space information for devices having a second type. The apparatus also includes means for selecting a CORESET size from a plurality of preconfigured CORESET sizes based on a subcarrier spacing used to communicate with the base station. The apparatus further includes means for monitoring a set of time and frequency resources to receive a message from the base station. The set of time and frequency resources have the selected CORESET size.

In an additional aspect of the disclosure, a non-transitory computer-readable medium stores instructions that, when executed by a processor, cause the processor to perform operations. The operations include receiving, from a base station at a UE having a first type, a MIB within a PBCH. The MIB includes CORESET size information and search space information for devices having a second type. The operations also include selecting a CORESET size from a plurality of preconfigured CORESET sizes based on a subcarrier spacing used to communicate with the base station. The operations further include monitoring a set of time and frequency resources to receive a message from the base station. The set of time and frequency resources have the selected CORESET size.

In an additional aspect of the disclosure, a method for wireless communication includes transmitting, from a base station to a UE having a first type, a MIB within a PBCH. The MIB includes CORESET size information and search space information for devices having a second type. The method also includes selecting a CORESET size from a plurality of preconfigured CORESET sizes based on a subcarrier spacing used to communicate with the UE. The method further includes transmitting, to the UE, a message within a set of time and frequency resources. The set of time and frequency resources have the selected CORESET size.

In an additional aspect of the disclosure, an apparatus includes at least one processor and a memory coupled to the at least one processor. The at least one processor is configured to initiate transmission, to a UE having a first type, of a MIB within a PBCH. The MIB includes CORESET size information and search space information for devices having a second type. The at least one processor is also configured to select a CORESET size from a plurality of preconfigured CORESET sizes based on a subcarrier spacing used to communicate with the UE. The at least one processor is further configured to initiate transmission, to the UE, of a message within a set of time and frequency resources, the set of time and frequency resources having the selected CORESET size.

In an additional aspect of the disclosure, an apparatus includes means for transmitting, to a UE having a first type, a MIB within a PBCH. The MIB includes CORESET size information and search space information for devices having a second type. The apparatus also includes means for selecting a CORESET size from a plurality of preconfigured CORESET sizes based on a subcarrier spacing used to communicate with the UE. The apparatus further includes means for transmitting, to the UE, a message within a set of time and frequency resources. The set of time and frequency resources have the selected CORESET size.

In an additional aspect of the disclosure, a non-transitory computer-readable medium stores instructions that, when executed by a processor, cause the processor to perform operations. The operations include transmitting, from a base station to a UE having a first type, a MIB within a PBCH. The MIB includes CORESET size information and search space information for devices having a second type. The operations also include selecting a CORESET size from a plurality of preconfigured CORESET sizes based on a subcarrier spacing used to communicate with the UE. The operations further include transmitting, to the UE, a message within a set of time and frequency resources. The set of time and frequency resources have the selected CORESET size.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 illustrates an example of a physical broadcast channel (PBCH) format including a master information block (MIB) according to one or more aspects.

FIG. 5 illustrates an example allocation of resources in the frequency domain to a synchronize signal block (SSB) and a CORESET according to one or more aspects.

FIG. 6 illustrates another example allocation of resources in the frequency domain to a SSB and a CORESET according to one or more aspects.

Like reference numbers and designations in the various drawings indicate like elements.

DETAILED DESCRIPTION

Figure 1:
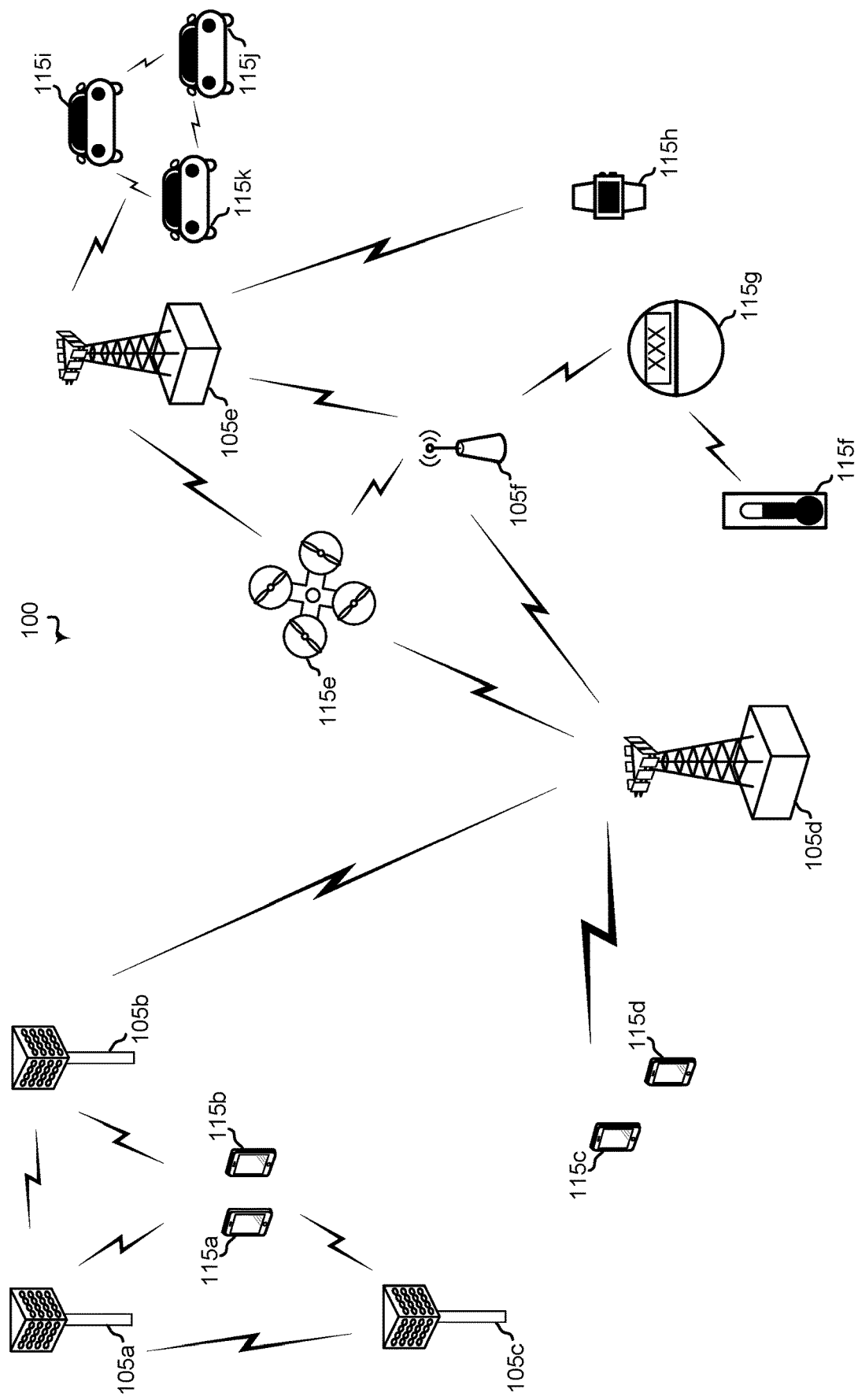
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support reduced bandwidth devices, such as devices that communicate via bandwidths of 20 megahertz (MHz) or less, particularly 5 MHz or less, in 5th generation new radio (5G-NR) wireless networks. In particular, the techniques described herein support allocation of resources to multiple control resource sets (CORESETs), such as initial CORESETs (e.g., CORESET0), to different types of devices. To illustrate, wireless communication devices configured for 5 MHz or less operations, referred to herein as reduced bandwidth devices, "superlight" devices, or "NR-superlight" devices, may be configured to receive a physical broadcast channel (PBCH), and a master information block (MIB), that configures CORESET0 for typical, non-reduced bandwidth devices. However, the reduced bandwidth devices may not support the CORESET0 for the non-reduced bandwidth devices due to the bandwidth devices. Thus, an MIB of the present disclosure that configures CORESET0 for non-reduced bandwidth devices may also include additional information to assist in configuring a CORESET0-BR for reduced bandwidth devices, and the reduced bandwidth devices may determine the configuration of CORESET0-BR based on the additional information in the MIB and based on information stored at, or capable of determination by, the reduced-bandwidth devices. For example, the reduced bandwidth devices may be configured to select a CORESET size for CORESET0-BR from multiple preconfigured CORESET sizes based on a subcarrier spacing (or another wireless communication parameter), and the CORESET size (e.g., a number of time resources and frequency resources allocated to CORESET0-BR) that is selected may be different from a CORESET size indicated in the MIB for CORESET0. For example, the selected CORESET size for CORESET0-BR may have a smaller dimension in the frequency domain (e.g., 5 MHz or less) and a larger dimension in the time domain (e.g., seven or fourteen orthogonal frequency division multiplexing (OFDM) symbols, instead of one, two, or three OFDM symbols) than the CORESET size indicated in the MIB. The reduced bandwidth devices may also determine other parameters, such as a synchronization signal block (SSB) frequency offset and search space information, for CORESET0-BR. The parameters may be determined based on bits of the PBCH that are reserved or otherwise unused for configuring CORESET0 and based on information stored at, or determinable by, the reduced bandwidth devices. Although described in the context of CORESET0, the techniques of the present disclosure may be applied to any CORESET configured by any type of message.

To illustrate operation of a wireless communication system that supports multiple CORESET0s for multiple types of devices, a user equipment (UE) having a first type (e.g., a reduced bandwidth device or superlight device) may receive a MIB within a PBCH from a base station. The MIB may include configuration information, such as CORESET size information and search space information, for CORESET0 defined for devices having a second type (e.g., non-reduced bandwidth devices or non-superlight devices configured for larger operating bandwidths). The UE may select a CORESET size for a CORESET0-BR defined for devices having the first type from multiple preconfigured CORESET sizes based on a subcarrier spacing used to communicate with the base station. For example, a wireless communication standard specification, such as a 3rd Generation Partnership Project (3GPP) standard specification, may designate multiple CORESET sizes to be used for CORESET0-BR, each of which may be associated with a different subcarrier spacing (or other communication parameter value). The UE may select the appropriate CORESET size (e.g., allocation of time and frequency resources) based on the subcarrier spacing, and the UE may monitor a set of time and frequency resources having the selected CORESET size to receive a message within a physical downlink control channel (PDCCH) from the base station. For example, the UE may monitor a different set of time and frequency resources (e.g., resources allocated to CORESET0-BR) than a set of time and frequency resources (e.g., resources allocated to CORESET0) monitored by UEs having the second type. In some implementations, the MIB may indicate an SSB frequency offset corresponding to CORESET0, and the UE may determine an SSB frequency offset corresponding to CORESET0-BR based at least in part on the SSB frequency offset corresponding to CORESET0. For example, the SSB frequency offset corresponding to CORESET0-BR may be the same as the SSB frequency offset corresponding to CORESET0 or may be equal to a sum of the SSB frequency offset corresponding to CORESET0 and an additional offset value. The additional offset value may be based on a parameter value, such as SCS, or may be based on the SSB frequency offset for CORESET0. In some implementations, one or more bits of the PBCH that are reserved or otherwise unused for configuring CORESET0 may be used to provide an indicator of search space information for CORESET0-BR. For example, a multibit value derived from the reserved or unused bits may be used by the UE to determine search space information that corresponds to CORESET0-BR, such as a monitoring pattern and a repetition number for PDCCH occasions.

Particular implementations of the subject matter described in this disclosure may be implemented to realize one or more of the following potential advantages or benefits. In some aspects, the present disclosure provides techniques for supporting multiple CORESETS for multiple types of devices, including devices configured for reduced bandwidth operation. The multiple CORESETs may be configured using a single message, such as an MIB, that is already configured to provide configuration of a CORESET for one type of devices. For example, instead of using a CORESET size (e.g., an allocation of time and frequency resources) indicated by the MIB, a reduced bandwidth UE may determine a CORESET size based on a subcarrier spacing used by the reduced bandwidth UE. Additionally, the reduced bandwidth UE may determine other configuration parameters for a respective CORESET based on information included in the MIB in place of bits that would otherwise be reserved or unused and based on information stored at, or determinable by, the reduced bandwidth UE. In this manner, wireless communication devices configured for reduced bandwidth operation, such as 5 MHz or less bandwidth, may be able to use a combination of prestored information (e.g., information described in one or more wireless communication standard specifications) and information included in an MIB that configures a CORESET for other types of devices to determine an allocation of time and frequency resources, and other parameters, to a CORESET defined for the wireless communication devices having the reduced bandwidth operation. The techniques described herein enable a wireless communication system to support both reduced bandwidth devices and other devices using individual CORESETs without defining different MIB formats for each type of device, which reduces complexity and time of modifying current wireless communication systems to support the reduced bandwidth devices and reduces overhead and congestion in the wireless network.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
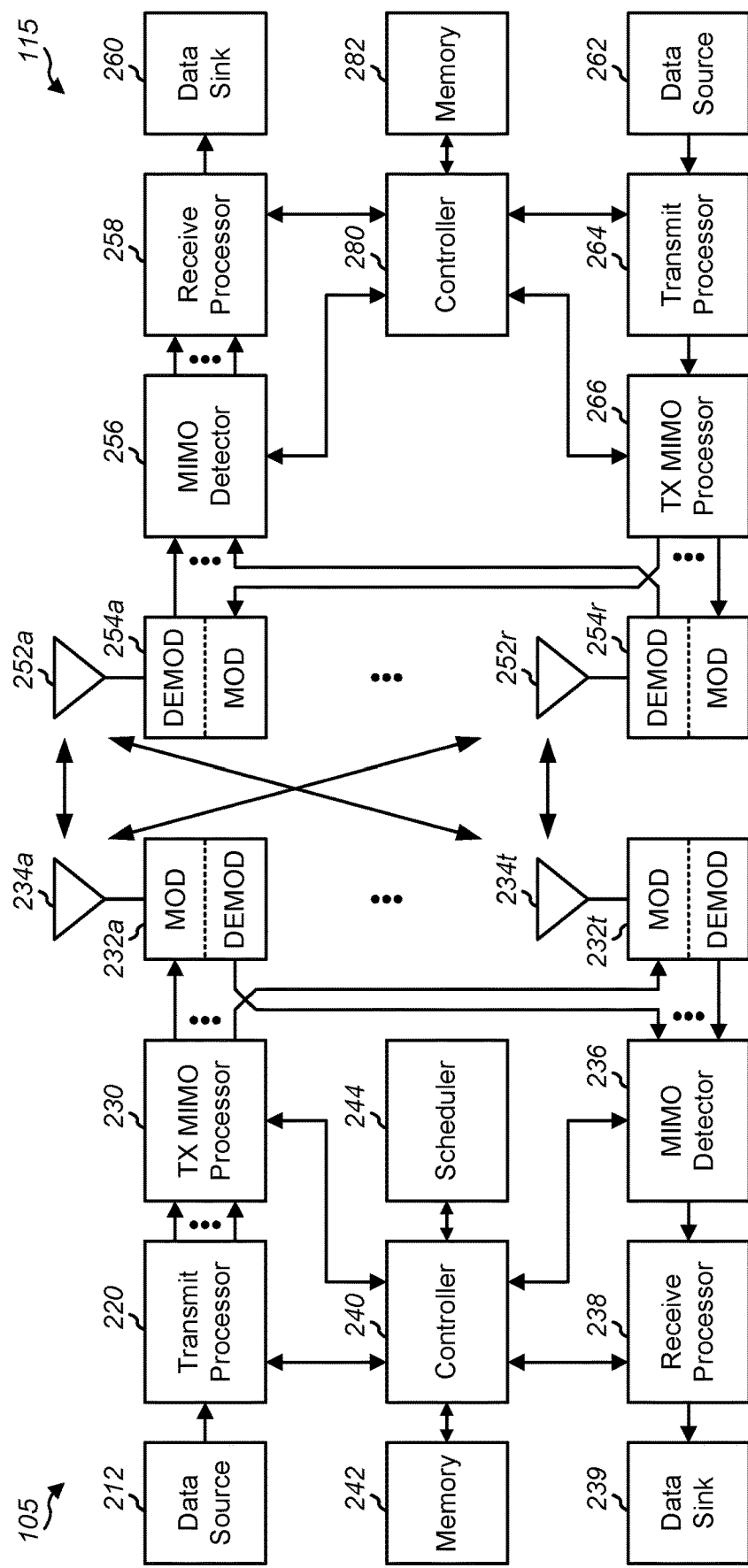
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 8 and 10, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

FIG. 3 is an example of a PBCH format 300 including an MIB according to one or more aspects. In some implementations, the PBCH format 300 may be described in one or more wireless communication standard specifications, such as a 3GPP specification, as a non-limiting example. The PBCH format 300 may be used by a network entity, such as a base station, to transmit information via a MIB within a PBCH to one or more UEs to for use in connecting to the base station. In the example shown in FIG. 3, the PBCH format 300 corresponds to communications within the FR1 frequency range. A PBCH format for the FR2 frequency range, or other frequencies, may have different formats than shown in FIG. 3.

The PBCH format 300 includes layer 1 (L1) information 302 (e.g., physical (PHY) layer information) and layer 2 (L2) information 310 (e.g., data link layer information). The L2 information 310 may also be referred to as L2 MIB information 310 for communication of CORESET parameters and other information. The L1 information 302 may include multiple fields and bits, such as a least significant bits (LSB) of a system frame number (SFN) field (LSB SFN), a half radio frame bit, a most significant bits (MSB) of a synchronization signal block (SSB) index field, and an MSB SSB frequency offset field. The L1 information 302 may also include reserved bits 304 that are not used for communication of CORESET parameters and other information. In some implementations the reserved bits 304 include two reserved bits.

The L2 MIB information 310 may include multiple fields and bits, such as an MSB SFN field, a subcarrier spacing bit, an SSB frequency offset field, a demodulation reference signal (DMRS) Type A position bit, a physical downlink control channel (PDCCH)-system information block-one (SIB1) configuration field (PDCCH-ConfigSIB1), a cell barred bit, and an intra-frequency reselection bit. The L2 MIB information 310 may also include a reserved bit 312 that is not used for communication of CORESET parameters and other information. Although shown in FIG. 3 as a single bit, in some other implementations, more than one bit of the L2 MIB information 310 may be reserved or otherwise unused.

The PDCCH-ConfigSIB1 field typically includes four bits for indicating a size of a CORESET with index 0, referred to as CORESET0 or CORESET #0 (e.g., an initial CORESET configured in an MIB and not in later dedicated signaling) and four bits for indicating physical downlink control channel (PDCCH) search space information (e.g., a monitoring pattern and a repetition indicator for PDCCH occasions within time and frequency resources allocated to CORESET0). Typically, the size of CORESET0 in the time domain is one, two, or three orthogonal frequency division multiplexing (OFDM) symbols, and the size in the frequency domain is a multiple of six resource blocks. Because current wireless communication standard specifications describe up to sixteen options for each of the two four-bit indicators, there are not unused values of the four-bit indicators to use to represent additional CORESET sizes and search space information for reduced bandwidth devices. If the resources allocated to CORESET0 by the PBCH are not supported by reduced bandwidth devices (e.g., CORESET0 is allocated to a bandwidth that is greater than a maximum operating bandwidth of the reduced bandwidth devices), another PBCH that configures CORESET0 for reduced bandwidth devices could be communicated by a base station. However, increasing the number of PBCHs increases overhead and congestion in the networks.

Figure 4:
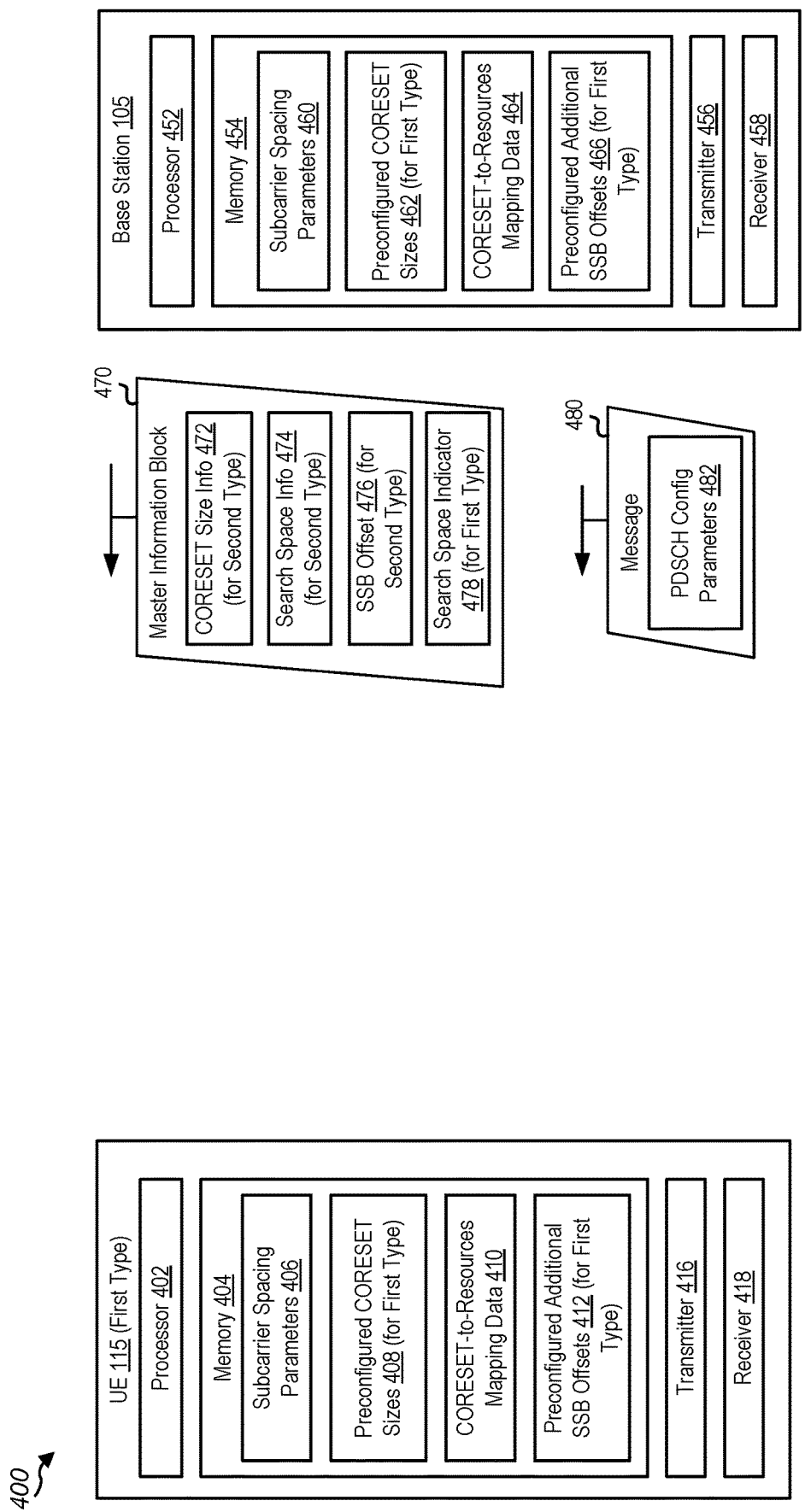
FIG. 4 is a block diagram illustrating an example wireless communication system that supports allocating control resource sets (CORESETs) for multiple types of devices according to one or more aspects.

FIG. 4 is a block diagram of an example wireless communications system 400 that supports allocating CORESETs for multiple types of devices according to one or more aspects. The multiple CORESETs may be allocated (e.g., defined or configured) using a single PBCH that configures a CORESET for one type of devices, and a portion of information included in the PBCH and information stored at the other type of devices may be used to allocate a CORESET for the other type of devices. The multiple types of devices may include a first type (e.g., reduced bandwidth devices, also referred to as "superlight" or "NR-superlight" devices) and a second type (e.g., non-reduced bandwidth devices, also referred to as typical devices, NR devices, legacy devices, or the like). In some implementations, wireless communication devices having the first type may be configured to communicate via reduced bandwidth communications, such as 5 MHz or less bandwidths. In some other implementations, wireless communication devices having the first type may be configured to communicate via wider, but still reduced, bandwidths, such as 20 MHz or less, or other bandwidths. Wireless communication devices having the second type may be configured to communicate via wider channel bandwidths (e.g., greater than 5 MHz or greater than 20 MHz), such as 50, 100, 200, or 400 MHz, as non-limiting examples. In some examples, wireless communications system 400 may implement aspects of wireless network 100. Wireless communications system 400 includes UE 115 and base station 105. Although one UE 115 and one base station 105 are illustrated, in some other implementations, wireless communications system 400 may generally include multiple UEs 115, and may include more than one base station 105.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store subcarrier spacing (SCS) parameters 406, preconfigured CORESET sizes 408 corresponding to the first type, CORESET-to-resource mapping data 410, and, optionally, preconfigured additional SSB frequency offsets 412. The SCS parameters 406 may indicate a SCS for wireless communications by the UE 115. The multiple preconfigured CORESET sizes 408 may indicate various CORESET sizes (e.g., numbers of time and frequency resources) for various CORESETs for use by devices having the first type (e.g., superlight devices). The preconfigured CORESET sizes 408 may include multiple CORESET sizes that may correspond to one or more parameters, such as CORESET indices, SCS values, or the like. The preconfigured CORESET sizes 408 may be defined in one or more wireless communication standard specifications, such as a 3GPP standard, as a non-limiting example. In some implementations, the preconfigured CORESET sizes 408 are stored at the memory 404 during manufacture, setup, or deployment of the UE 115. Additionally or alternatively, one or more of the preconfigured CORESET sizes 408 may be received from another device, such as being included in a software or firmware update for the UE 115. The CORESET-to-resource mapping data 410 may indicate resource allocations for the CORESETs having the preconfigured CORESET sizes 408. As an illustrative, non-limiting example, the CORESET-to-resource mapping data 410 may indicate that a first CORESET associated with a first SCS value is allocated to a first set of frequency resources (e.g., physical resource blocks (PRBs)) and a first set of time resources (e.g., orthogonal frequency division multiplexing (OFDM) symbols or slots). Although described as separate elements, in some implementations, the preconfigured CORESET sizes 408 and the CORESET-to-resource mapping data 410 may be included in a single set of CORESET configuration data. The preconfigured additional SSB frequency offsets 412 may indicate one or more additional SSB offset values, which may be associated with other parameters, for use in determining SSB allocation within a CORESET. Additional details of the SCS parameters 406, the preconfigured CORESET sizes 408, the CORESET-to-resource mapping data 410, and the additional SSB offsets are described below.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store SCS parameters 460, preconfigured CORESET sizes 462 for the first type of devices, CORESET-to-resources mapping data 464, and preconfigured additional SSB offsets 466. The SCS parameters 460, the preconfigured CORESET sizes 462, the CORESET-to-resources mapping data 464, and the preconfigured additional SSB offsets 466 may include or correspond to the SCS parameters 406, the preconfigured CORESET sizes 408, the CORESET-to-resources mapping data 410, and the preconfigured additional SSB frequency offsets 412, respectively. Although described as separate elements, in some implementations, the preconfigured CORESET sizes 462 and the CORESET-to-resource mapping data 464 may be included in a single set of CORESET configuration data.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP. Additionally, the wireless communications system 400 may support reduced bandwidth (e.g., superlight) devices. For example, the UE 115 and the base station 105 may be configured to communicate via a reduced bandwidth (e.g., channel bandwidth), such as 5 MHz or less or 20 MHz or less, as non-limiting examples, and the base station 105 may be configured to communicate with other UEs via a larger bandwidth, such as 50, 100, 200, or 400 MHz, as non-limiting examples.

During operation of wireless communications system 400, the base station 105 broadcasts a master information block (MIB) 470 to enable UEs searching for a cell to receive information that schedules additional messages for use to connect to the base station 105. The base station 105 may broadcast the MIB 470 within a physical broadcast channel (PBCH) to devices within a coverage range of the base station 105. The UE 115 may receive the MIB 470 from the base station 105, such as while the UE 115 performs a cell search process (e.g., the UE 115 may monitor for one or more broadcast channels from nearby base stations). The MIB 470 and the PBCH may include information related to additional communications from the base station 105 that are not broadcast within the PBCH and that enable the UE 115 to connect to the base station 105. To illustrate, the MIB 470 and the PBCH may include information that defines (e.g., configures or allocates) a CORESET and PDCCH opportunities for receiving downlink control information (DCI) via additional radio resource control (RRC) messages. For example, the MIB 470 and the PBCH may include CORESET size information 472, search space information 474, and an SSB frequency offset 476. The CORESET size information 472 may indicate a size associated with a CORESET, an allocation of time and frequency resources to the CORESET, or a combination thereof. The search space information 474 may indicate a monitoring pattern and repetition number for PDCCH occasions within the time and frequency resources allocated to the CORESET. The SSB frequency offset 476 may indicate an offset (in the frequency domain) of an SSB from a staring frequency associated with the CORESET (e.g., a starting frequency of a first physical resource block (PRB) allocated to the CORESET). In some implementations, the CORESET configured by the MIB 470 is CORESET0 (e.g., an initial CORESET, also referred to as CORESET zero or CORESET #0). Alternatively, the CORESET may be a different CORESET, such as a CORESET having an index of 1, 2, or another value, if an MIB is configured to define CORESETS other than CORESET0. Each of the CORESET size information 472, the search space information 474, and the SSB frequency offset 476 may configure CORESET0 for devices having the second type. The MIB 470 and the PBCH may also include other information, such as a SFN, a SCS value, or the like, that is used to configure CORESET0 or communications that occur via time and frequency resources allocated to CORESET0, such as one or more of the fields or bits described with reference to FIG. 3. In some implementations, one or more of the CORESET size information 472, the search space information 474, and the SSB frequency offset 476 may include or correspond to fields or bits described with reference to FIG. 3. For example, the CORESET size information 472 and the search space information 474 may include or correspond to the PDCCH-ConfigSIB1 field of FIG. 3 and the SSB frequency offset 476 may include or correspond to the SSB frequency offset field of FIG. 3.

UEs (or other devices) having the second type may receive the PBCH and the MIB 470 and use the information included in the PBCH and the MIB 470 to identify an allocation of physical resources (e.g., time and frequency resources) and various parameters associated with CORESET0 and related PDCCH(s), which may be used to communicate additional RRC messages, such as a system information block one (SIB1) message, as a non-limiting example. These UEs may monitor time and frequency resources allocated to the CORESET, particularly PDCCH occasions, to receive the SIB1 (or another RRC message). As non-limiting examples, UEs having the second type may include smart phones, tablet computers, laptop computers, wearables, vehicles (or components thereof), or other devices configured to communicate in accordance with one or more 5G NR standard specifications. However, the CORESET0 that is configured by the MIB 470 may be incompatible with devices that have the first type. To illustrate, the CORESET0 for devices having the second type may be allocated to a larger bandwidth than is supported by UEs (or other devices) having the first type. For example, a bandwidth that is larger than 20 MHz, or that is larger than 5 MHz, may be allocated to the CORESET0 associated with the second type (e.g., the CORESET size information 472 and the search space information 474 do not support less than 20 MHz, or less than 5 MHz, operation), and UEs having the first type may be configured to communicate via bandwidths that are less than 20 MHz, or less than 5 MHz, and therefore these UEs may not be able to properly receive the SIB1. As non-limiting examples, UEs having the first type may include wireless sensors, metering devices, asset tracking devices, and personal IoT devices.

Instead of using the CORESET0 configured by the MIB 470, the UE 115 may use a different CORESET0 that is configured for devices having the first type and that is allocated to frequency resources that are supported by devices having the first type. Such a CORESET0 is referred to herein as CORESET0-Bandwidth Reduction (CORESET0-BR). As such, instead of using the CORESET size information 472 included in the MIB 470 to indicate the size of CORESET0-BR, the UE 115 may select a CORESET size from the preconfigured CORESET sizes 408 based on a SCS used to communicate with the base station 105. For example, the UE 115 may be configured to communicate with other devices using a particular SCS value, which may be included in the SCS parameters 406, such as 15 kilohertz (kHz) or 30 kHz, as non-limiting examples. SCS represents the difference in frequency between subcarriers in PRBs, and SCS can have one of multiple values in 5G NR systems. The UE 115 may be configured to perform all communications according to a single SCS value, or the UE 115 may be configured to communicate with different devices, or in different operating modes, according to different SCS values. For example, the UE 115 may be configured to use a SCS of 15 kHz in a first operating mode and to use a SCS of 30 kHz in a second operating mode. Additionally or alternatively, the UE 115 may be configured to communicate with devices in a network using an SCS value indicated by the network. For example, the MIB 470 may indicate the SCS value to be used when communicating in the network provided by the base station 105. Although described as being used for communications, the SCS value may be used for particular types of communications, such as SSBs, PDCCHs, and others, and different types of communications may correspond to different SCS values. For example, an SSB may correspond to a different SCS than a PDCCH, as a non-limiting example.

The UE 115 may select, from the preconfigured CORESET sizes 408, a CORESET size that corresponds to the SCS used by the UE 115 (e.g., a PDCCH SCS if such an SCS is defined). For example, each of the preconfigured CORESET sizes 408 may correspond to a respective SCS value, and the UE 115 may select the CORESET size that corresponds to the SCS value associated with communications with the base station 105. The selected CORESET size (e.g., from the plurality of preconfigured CORESET sizes 408) for CORESET0-BR is different than a CORESET size of CORESET0 defined by the MIB 470. For example, the selected CORESET size for CORESET0-BR may be larger in the time domain and smaller in the frequency domain than a CORESET size of CORESET0 defined for devices having the second type. As a non-limiting example, the CORESET size information 472 may indicate a size in the time domain of one, two, or three OFDM symbols and a size in the frequency domain of 50 MHz, and the CORESET size selected by the UE may be greater than three OFDM symbols in the time domain and up to 5 MHz, or up to 20 MHz, in the frequency domain.

Because at least some of the preconfigured CORESET sizes 408 correspond to different SCS values, the UE 115 may select different CORESET sizes for CORESET0-BR when communicating according to different SCS values. To illustrate, if the SCS value to be used by the UE 115 has a first SCS value, the UE 115 may select a first CORESET size from the preconfigured CORESET sizes 408 that corresponds to the first SCS value, and if the SCS value has a second SCS value, the UE 115 may select a second CORESET size from the preconfigured CORESET sizes 408 that corresponds to the second SCS value. As a non-limiting example, the first SCS value may be 15 kHz, the first CORESET size may be twenty-four physical resource blocks (PRBs) in the frequency domain and seven OFDM symbols in the time domain, the second SCS value may be 30 kHz, and the second CORESET size may be twelve PRBs in the frequency domain and fourteen OFDM symbols in the time domain.

After selecting the CORESET size for CORESET0-BR, the UE 115 may monitor a set of time and frequency resources having the selected CORESET size to receive a message 480 from the base station 105. The set of time and frequency resources may be identified based on the CORESET-to-resources mapping data 410, which may map allocation of time and frequency resources to various CORESETs for devices having the first type. To identify the set of time and frequency resources, the UE 115 may compare one or more parameters, such as the selected CORESET size, a CORESET index (e.g., zero for CORESET0-BR), the SCS value, or a combination thereof, to parameters associated with the resource allocations indicated by the CORESET-to-resources mapping data 410 to select an allocation of time and frequency resources to be monitored for the message 480. In some implementations, the CORESET-to-resources mapping data 410 may represent one or more tables that map various time and frequency resources allocations and other information for CORESET0-BR to parameters such as SSB SCS, PDCCH SCS, frequency range, minimum bandwidth, or other parameters. The selected time and frequency resources may include or indicate time resources, such as a starting time (e.g., an initial OFDM symbol or slot) and a duration (e.g., a total number of OFDM symbols or slots), and frequency resources, such as an initial frequency (e.g., a starting frequency or index of an initial PRB) and a total number of PRBs.

The base station 105 may transmit the message 480 within time and frequency resources that match the time and frequency resources determined by the UE 115 for CORESET0-BR. For example, the base station 105 may determine a set of time and frequency resources to be allocated to CORESET0-BR in a similar manner to the UE 115, using the SCS parameters 460, the preconfigured CORESET sizes 462, and the CORESET-to-resources mapping data 464. The base station 105 may transmit the message 480 within the selected time and frequency resources to indicate information to the UE 115 for determining additional resource allocations (e.g., scheduling or configurations) for DL or UL communications used to connect to the base station 105. For example, the message 480 may be a RRC message, such as SIB1, that indicates configuration parameters corresponding to a physical downlink shared channel (PDSCH), and the UE 115 may monitor a second set of time and frequency resources in accordance with the configuration parameters indicated by the message 480 to receive additional messages, such as downlink data packets or other information, from the base station 105. To illustrate, the message 480 may include PDSCH configuration parameters 482 that indicate an allocation of time and frequency resources (e.g., a second set of time and frequency resources) to a PDSCH to be used by the base station 105 for transmitting data to the UE 115. The UE 115 may monitor the time and frequency resources indicated by the PDSCH configuration parameters 482 to receive the data. Additionally or alternatively, the message 480 may indicate an allocation of resources to one or more uplink channels for use by the UE 115 in messaging the base station 105. For example, the message 480 may include configuration parameters for a physical uplink control channel (PUCCH) or a physical uplink shared channel (PUSCH).

In order to monitor the set of time and frequency resources for the message 480, the UE 115 may determine one or more other parameters associated with CORESET0-BR, based on information stored at or known by the UE 115 (and stored at or known by the base station 105) and based on a portion of the MIB 470 and the PBCH. The other parameters may include an SSB frequency offset, search space information, other information, or a combination thereof, associated with CORESET0-BR. In some implementations, reduced bandwidth devices may be configured to operate using a fixed starting slot for a DMRS if DMRS Type A is used, such that the DMRS information included in the MIB 470 is ignored. Alternatively, the UE 115 may select one of multiple prestored or preconfigured DMRS slots based on one or more communication parameter values, based on the related information for CORESET0 included in the MIB 470 and the PBCH, or a combination thereof. The SSB frequency offset corresponding to CORESET0-BR indicates an offset, in the frequency domain, between an SSB and an overall resource block grid (e.g., a lowest subcarrier of the first RB that overlaps the SSB). In some implementations, the SSB frequency offset for CORESET0-BR may be fixed, such as to a particular frequency, or one of multiple frequencies that each correspond to one or more parameters, such as SCS (e.g., SSB SCS). For example, a first SSB offset frequency may be used for an SCS of 15 kHz, and a second SSB offset frequency may be used for an SCS of 30 kHz.

Alternatively, the UE 115 may determine an SSB frequency offset that corresponds to CORESET0-BR based at least in part on the SSB frequency offset 476 that corresponds to CORESET0 (e.g., for devices having the second type). In some implementations, the SSB frequency offset for CORESET0-BR is the same as the SSB frequency offset 476 for CORESET0, as further described herein with reference to FIG. 5. In some other implementations, the SSB frequency offset for CORESET0-BR is a sum of the SSB frequency offset 476 and an additional SSB frequency offset selected from the preconfigured additional SSB frequency offsets 412, as further described herein with reference to FIG. 6. The additional SSB frequency offset may be selected based on a value of the SSB frequency offset 476. To illustrate, the UE 115 may select an additional SSB frequency offset from the preconfigured additional SSB frequency offsets 412 based on results of a comparison of the SSB frequency offset 476 and a threshold. For example, the UE 115 may select a first offset value from the preconfigured additional SSB frequency offsets 412 if the SSB frequency offset 476 is less than a first threshold. If the SSB frequency offset 476 is greater than or equal to the threshold, the UE 115 may select a second offset value from the preconfigured additional SSB frequency offsets 412. Alternatively, each of the preconfigured additional SSB frequency offsets 412 may correspond to a respective SCS value, and the UE 115 may select the additional offset value based on the SCS (e.g., an SSB SCS) used to communicate with the base station 110. Alternatively, the UE 115 may select the additional offset value from the preconfigured additional SSB frequency offsets 412 based on the SCS value and the SSB frequency offset 476. For example, each of the preconfigured additional SSB frequency offsets 412 may correspond to a respective SCS value (e.g., an SSB SCS) and respective results of comparing the SSB frequency offset 476 to one or more thresholds. The SSB frequency offset for CORESET-BR may be used to determine a starting frequency (e.g., a lowest subcarrier) allocated to CORESET-BR, which may be used by the UE 115 to determine the frequency resources allocated to CORESET-BR, PDCCH occasions, or both. The base station 105 may similarly select the additional offset from the preconfigured additional SSB offsets 466, for use in selecting the frequency resources to be allocated to CORESET-BR, the PDCCH occasions, or both.

In addition to determining the SSB frequency offset corresponding to CORESET0-BR, the UE 115 may identify search space information corresponding to CORESET0-BR based on the MIB 470. For example, the MIB 470 may include a search space indicator 478 corresponding to CORESET0-BR. The search space indicator 478 may include or correspond to one or more particular bits of the PBCH, the MIB 470, or both, such as reserved or otherwise unused bits in MIBs and PBCHs that configure CORESET0. In some implementations, the search space indicator 478 includes multiple reserved bits of a PHY layer of the PBCH block and a reserved bit of the MIB 470. In some implementations, the UE 115 is configured to communicate via bandwidths within FR1, and the MIB 470 includes the reserved bits 304 of the L1 information 302 and the reserved bit 312 of the L2 MIB information 310 of FIG. 3. In some other implementations, the UE 115 may be configured to communicate within FR2 or other bandwidth ranges, and one or both of the reserved bits 304 may be used for communicating information related to the CORESET for devices having the second type. In such implementations, one or more other bits of the MIB 470 or another message may be used as part of search space indicator 478.

The search space indicator 478 may be a multibit value that corresponds to or indicates a monitoring pattern and a repetition number for PDCCH occasions in CORESET0-BR. PDCCH occasions refer to an allocation of one or more sets of time and frequency resources of CORESET0-BR to PDCCHs for communicating DCI, such as the message 480. For example, the monitoring pattern may be one of multiple predefined or preconfigured monitoring patterns associated with a respective subset of system frame numbers (SFNs) and a respective starting slot for the PDCCH occasion, and the repetition number may be associated with a number of slots during which the PDCCH occasion is repeated. Examples of monitoring patterns and repetition numbers are further described herein with reference to FIG. 7. The monitoring pattern and the repetition number indicated by the search space indicator 478 may be selected by the base station 105 to provide the best coverage of the PDCCH and respective messaging, such as the message 480, based on information stored at the base station 105, information received from other devices (e.g., UEs, neighboring base stations, other interfering devices, etc.), or a combination thereof.

The UE 115 may use the determined additional SSB frequency offset, the monitoring pattern, and the repetition number to receive and decode the message 480 within one or more PDCCH occasions within the set of time and frequency resources allocated to CORESET0-BR. For example, one or more PDCCHs may be scheduled for portions of the set of time and frequency resources allocated to CORESET0-BR, and the UE 115 may receive and decode the message 480, or repetitions thereof, via the scheduled PDCCHs. Repeating the PDCCH occasion and the message 480 may increase coverage of the message 480 by enabling devices having the first type that are unable to receive an entirety of the message 480 at one PDCCH occasion to receive a remainder, or an entirety, of the message 480 at another PDCCH occasion.

As described with reference to FIG. 4, the present disclosure provides techniques for allocating time and frequency resources for CORESETs, such as CORESET0, for wireless communication devices that support reduced bandwidth operation. For example, instead of using a CORESET size (e.g., an allocation of time and frequency resources) indicated by the MIB 470 for CORESET0, the UE 115 may determine a CORESET size for CORESET0-BR based on a SCS value used for communications at the base station 105 (e.g., a PDCCH SCS). Additionally, the UE 115 may identify parameters of CORESET0-BR based on information stored or determined at the UE 115 and based on bits that would otherwise be unused in the MIB 470 (e.g., for communicating parameters corresponding to CORESET0). In this manner, wireless communication devices configured for reduced bandwidth operation (e.g., having the first type), such as 20 MHz or less bandwidth, or 5 MHz or less bandwidth, may be able to use a combination of prestored or determinable information (e.g., information described in one or more wireless communication standard specifications) and information included in the MIB 470 to determine an allocation of time and frequency resources, and other parameters, for a CORESET0-BR. The techniques described herein enable a wireless communication system to support CORESET0s for both reduced bandwidth devices and other devices without defining device type-specific MIB formats and communicating multiple MIBs, which reduces complexity and time of modifying current wireless communication systems to support the reduced bandwidth devices and reduces overhead and congestion in the network.

FIGS. 5 and 6 illustrate example allocations of resources in the frequency domain to SSBs and CORESETs according to one or more aspects. The CORESETs of FIGS. 5 and 6 ("CORESET0-BR") may be initial CORESETs (e.g., may have an index of 0) and may be defined for devices having a first type (e.g., devices configured for reduced bandwidth operation, such as those having an operating bandwidth of 20 MHz or less, or 5 MHz or less). As shown in FIGS. 5 and 6, CORESET0-BR is allocated to 24 PRBs in the frequency domain and the SSB is allocated to 20 PRBs in the frequency domain, with respective SCS values of 15 kHz. In other implementations, CORESET0-BR may be allocated to more or fewer than 24 PRBs, the SSB may be allocated to more or fewer than 20 PRBs, and the respective SCS values may be greater or less than 15 kHz. In FIGS. 5 and 6, a first PRB that overlaps the SSB is labeled as $N_{CRB}^{SSB}$ and $K_{SSB}$ represents an SSB frequency offset for a CORESET0 that is defined for devices having the second type (e.g., devices configured for non-reduced bandwidth operation). As explained above, a UE (such as the UE 115) may receive a PBCH that includes configuration parameters for CORESET0, which may include $K_{SSB}$. For example, $K_{SSB}$ may correspond to the SSB frequency offset 476 of FIG. 4. In some implementations, an SSB frequency offset corresponding to CORESET0-BR may be a fixed value that is selected from multiple predefined SSB frequency offset values that correspond to values of various parameters, such as SCS, as described with reference to FIG. 4. Alternatively, in the examples shown in FIGS. 5 and 6, the SSB frequency offset corresponding to CORESET0-BR is equal to a sum of $K_{SSB}$ and an additional offset value. The additional offset value may be fixed for the SCS (or another parameter) or may be based on $K_{SSB}$.

FIG. 5 illustrates a first frequency diagram 500 of a first example. In the example shown in FIG. 5, the additional offset value is one of multiple fixed values that correspond to a respective SCS. For example, the additional offset value is 0 for 15 kHz SCS. In this example, the SSB frequency offset corresponding to CORESET0-BR is equal to $K_{SSB}$. A UE that receives the SSB may identify a first PRB allocated to CORESET0-BR by identifying the PRB that is offset from the first PRB of the SSB by $K_{SSB}$ in the resource grid.

FIG. 6 illustrates a second frequency diagram 600 of a second example. In the example shown in FIG. 6, the additional offset value is 2 PRBs. In this example, the SSB frequency offset corresponding to CORESET0-BR is equal to a sum of the additional offset (e.g., 2 PRBs) and $K_{SSB}$. In some implementations, the additional offset value is one of multiple fixed values that is selected based on one or more parameters, such as SCS. For example, the additional offset for 15 kHz SCS may be 2 PRBs, and the additional offset for 30 kHz may be 4 PRBs, as non-limiting examples. In some such implementations, one or more wireless communication standard specifications may define multiple offset values that are each associated with one or more parameter values, and the multiple offset values may be stored in memories of UEs and base stations during manufacture and deployment, or based on information received during operation, such as a software or firmware update. Additionally or alternatively, the additional offset value may be based on $K_{SSB}$. To illustrate, multiple additional offset values may be defined for different ranges of $K_{SSB}$, and the UE may select an additional offset value based on a comparison of $K_{SSB}$ to one or more thresholds. For example, the UE may select a first additional offset value based on $K_{SSB}$ being less than a first threshold, the UE may select a second additional offset value based on $K_{SSB}$ being greater than or equal to the first threshold and less than a second threshold, and the UE may select a third additional offset value based on $K_{SSB}$ being greater than or equal to the second threshold. A particular, non-limiting example of additional offset values defined for different ranges of $K_{SSB}$ is given in Table 1 below.

TABLE 1

Example Additional Offset Values Based on $K_{SSB}$

| $K_{SSB}$ (PRBs) | Additional Offset (PRBs) |
|---|---|
| $K_{SSB} < 6$ | 2 |
| $6 \leq K_{SSB} < 18$ | 1 |
| $18 \leq K_{SSB}$ | 0 |

Figure 7:
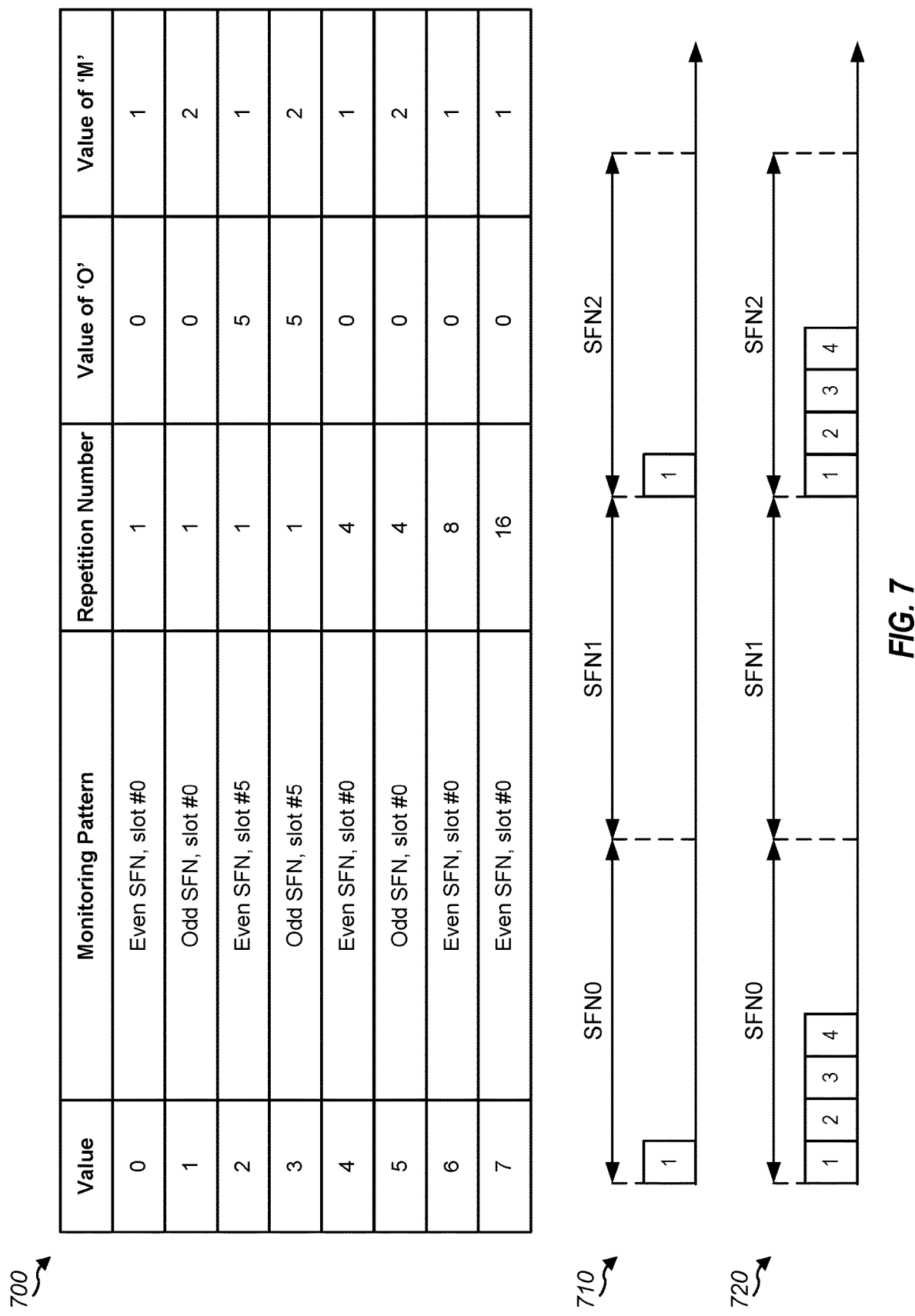
FIG. 7 illustrates an example mapping of monitoring patterns and repetitions for a search space according to one or more aspects.

FIG. 7 illustrates an example mapping of monitoring patterns and repetitions for a search space according to one or more aspects in table 700. The table 700 indicates monitoring patterns and repetition numbers for PDCCH occasions that correspond to a CORESET ("CORESET0-BR") defined for devices having a first type (e.g., reduced bandwidth devices). The monitoring patterns and repetition numbers are mapped to various values of a multibit indicator in the table 700. The multibit indicator may include or correspond to one or more reserved or otherwise previously unused bits in a PBCH that configures a CORESET0 for devices having a second type (e.g., non-reduced bandwidth devices). In some implementations, the multibit indicator having the values included in the table 700 may include or correspond to the search space indicator 478 of FIG. 4, which may be a three-bit indicator.

The table 700 includes, for each value of the multibit indicator, a monitoring pattern for PDCCH occasions defined by a value of '0' and a value of 'M', and a repetition number corresponding to repetition of PDCCH occasions. The monitoring pattern indicates which portions of the time resources allocated to CORESET0-BR are configured for PDCCH occasions. Allocation of frequency resources to CORESET0-BR is described above with reference to FIGS. 5 and 6. The monitoring pattern may correspond to a subset of radio frames (represented by a subset of SFNs), and a starting slot within the radio frames, during which PDCCH occasions are scheduled. The repetition number indicates the number of times that the PDCCH occasion is scheduled. If the repetition number is 1, there is a single PDCCH occasion. If the repetition number is 2 or greater, the PDCCH occasion is repeated one or more times in the next consecutive one or more slots from the slot indicated in the monitoring pattern. '0' and 'M' correspond to the starting slot and the subset of SFNs, respectively, associated with the PDCCH occasions (e.g., the values of '0' and 'M' represent the monitoring pattern in two binary values). For example, if 'M' has a first value (e.g., 1), then the subset of SFNs to be monitored for PDCCH occasions includes even SFNs, and if 'M' has a second value (e.g., 2), then the subset of SFNs to be monitored includes odd SFNs.

FIG. 7 also includes two timing diagrams, a first diagram 710 and a second diagram 720, illustrating examples of patterns and repetition for search spaces for PDCCH occasions within time resources allocated to CORESET0-BR. In the particular examples shown in FIG. 7, a PDCCH SCS is 15 kHz and each radio frame includes 10 slots that each have a duration of 1 millisecond (ms). In another implementation, a PDCCH SCS may be 30 kHz and each radio frame may include 20 slots that each have a duration of 0.5 ms. In other implementations for other PDCCH SCS values, each radio frame may include more than ten or fewer than ten slots, each slot may correspond to durations other than 1 ms or 0.5 ms, or a combination thereof.

The first diagram 710 represents an example search space that corresponds to a value of 0 for the multibit indicator in the table 700. To illustrate, PDCCH occasions are scheduled in even SFNs (e.g., SFN0 and SFN2) and in a first slot (e.g., slot #0) of the even SFNs. Further, because the repetition number is 1, the PDCCH occasion is scheduled once (e.g., in the first slot) and is not repeated in any consecutive subsequent slots of the even SFNs. The second diagram 720 represents an example search space that corresponds to a value of 4 for the multibit indicator in the table 700. To illustrate, PDCCH monitoring occasions are scheduled in even SFNs (e.g., SFN0 and SFN2) and in a first slot (e.g., slot #0) of the even SFNs. Further, because the repetition number is 4, the PDCCH occasion is scheduled in the first slot (e.g., slot #0), and repetitions of the PDCCH occasion are scheduled in the second slot (e.g., slot #1), the third slot (e.g., slot #2), and the fourth slot (e.g., slot #3) of the SFNs. Any DCI or other messages, such as a SIB1 message, that is transmit during the PDCCH occasion are retransmitted during the repetitions of the PDCCH occasions in the consecutive subsequent slots. Repeating the transmission of the messages within the PDCCH may improve the coverage of the messages, such as improving the coverage of an SIB1, as a non-limiting example.

Figure 8:
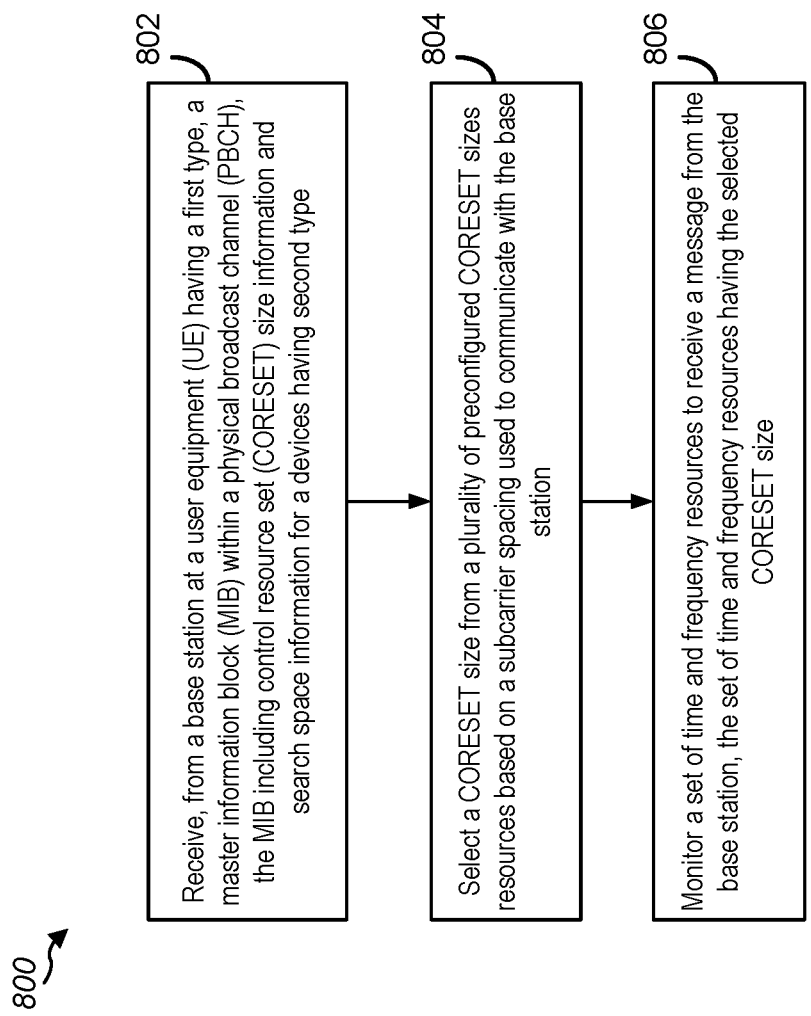
FIG. 8 is a flow diagram illustrating an example process that supports allocating CORESETs for multiple types of devices according to one or more aspects.

FIG. 8 is a flow diagram illustrating an example process 800 that supports allocating CORESETs for multiple types of devices according to one or more aspects. Operations of process 800 may be performed by a UE, such as UE 115 described above with reference to FIGS. 1, 2, 4, or a UE described with reference to FIG. 9. For example, example operations (also referred to as "blocks") of process 800 may enable UE 115 to support allocation of CORESETs to multiple types of devices having different operating bandwidths.

In block 802, the UE receives, from a base station, a MIB within a PBCH. The UE has a first type, and the MIB includes CORESET size information and search space information for devices having a second type. For example, the MIB may include or correspond to the MIB 470 of FIG. 4. In block 804, the UE selects a CORESET size from a plurality of preconfigured CORESET sizes based on a subcarrier spacing used to communicate with the base station. For example, the plurality of preconfigured CORESET sizes may include or correspond to the preconfigured CORESET sizes 408 of FIG. 4. In some implementations, the selected CORESET size is different than the CORESET size information for devices having the second type. For example, the selected size may be different than the CORESET size information 472 of FIG. 4. In block 806, the UE monitors a set of time and frequency resources to receive a message from the base station. The time and frequency resources have the selected CORESET size. For example, the message may include or correspond to the message 480 of FIG. 4.

In some implementations, selecting the CORESET size may include selecting a first CORESET size of the plurality of preconfigured CORESET sizes based on the subcarrier spacing having a first subcarrier spacing (SCS) value and selecting a second CORESET size of the plurality of preconfigured CORESET sizes based on the subcarrier spacing having a second SCS value that is greater than the first SCS value. For example, with reference to FIG. 4, the UE 115 may select one of the preconfigured CORESET sizes 408 based on the SCS parameters 406. In some such implementations, the first CORESET size includes 24 PRBs in the frequency domain and 7 symbols in the time domain, and the first SCS value includes 15 kHz. Alternatively, the second CORESET size may include 12 PRBs in the frequency domain and 14 symbols in the time domain, and the first SCS value may include 30 kHz.

In some implementations, the process 800 may include determining a SSB frequency offset for the set of time and frequency resources based at least in part on a SSB frequency offset for devices having the second type that is included in the MIB and the PBCH. A frequency location of the set of time and frequency resources may be based on the SSB frequency offset. For example, the SSB frequency offset for the set of time and frequency resources may be based at least in part on the SSB frequency offset 476 of FIG. 4. In some such implementations, the SSB frequency offset is the same as the SSB frequency offset for devices having the second type. Alternatively, the SSB frequency offset may include a sum of the SSB frequency offset for devices having the second type and an additional offset value that is based on the SSB frequency offset for devices having the second type. For example, the SSB frequency offset for devices having the second type may include or correspond to the SSB frequency offset 476 of FIG. 4, and the additional offset value may be included in the preconfigured additional SSB frequency offsets 412 of FIG. 4. In some such implementations, selecting the additional offset value may include selecting a first offset value based on the SSB frequency offset for devices having the second type being less than a first threshold, selecting a second offset value based on the SSB frequency offset for devices having the second type being greater than or equal to the first threshold and less than a second threshold, and selecting a third offset value based on the SSB frequency offset for devices having the second type being greater than or equal to the second threshold, as further described with reference to Table 1.

In some implementations, the message received via the set of time and frequency resources may include a RRC message that indicates configuration parameters corresponding to a PDSCH. For example, the configuration parameters may include or correspond to the PDSCH configuration parameters 482 of FIG. 4. In such implementations, the process 800 may further include monitoring a second set of time and frequency resources in accordance with the configuration parameters to receive downlink data from the base station.

In some implementations, the UE communicates with the base station via a bandwidth that is less than 20 MHz, and the CORESET size information and the search space information for devices having the second type does not support less than 20 MHz operation. For example, the CORESET size information 472 of FIG. 4 may indicate a CORESET that is allocated to a bandwidth that is larger than 20 MHz, or larger than 5 MHz, in the frequency domain. Additionally or alternatively, the CORESET size may corresponds to an initial CORESET (CORESET0) of a plurality of preconfigured CORESETs. For example, the CORESET configured by the MIB 470 of FIG. 4 may be CORESET0.

In some implementations, the MIB and the PBCH include an indicator of search space information for devices having the first type. For example, the indicator may include or correspond to the search space indicator 478 of FIG. 4. In some such implementations, the indicator of the search space information for devices having the first type includes one or more reserved bits of the PBCH, the MIB, or both. For example, the indicator may include one or more reserved or previously unused bits of the MIB 470 of FIG. 4 or of the PBCH block used to communicate the MIB 470. In some such implementations, the one or more reserved bits may include a plurality of reserved bits of a PHY layer of the PBCH and a reserved bit of the MIB. For example, the one or more reserved bits may include or correspond to the reserved bits 304 and the reserved bit 312 of FIG. 3. Additionally or alternatively, the indicator may correspond to one of a plurality of preconfigured monitoring patterns for the set of time and frequency resources a repetition number associated with a number of slots to be monitored. Each preconfigured monitoring pattern may be associated with a subset of SFNs and a starting slot. For example, the indicator may correspond to the monitoring pattern and repetition number represented in the table 700 of FIG. 7.

Figure 9:
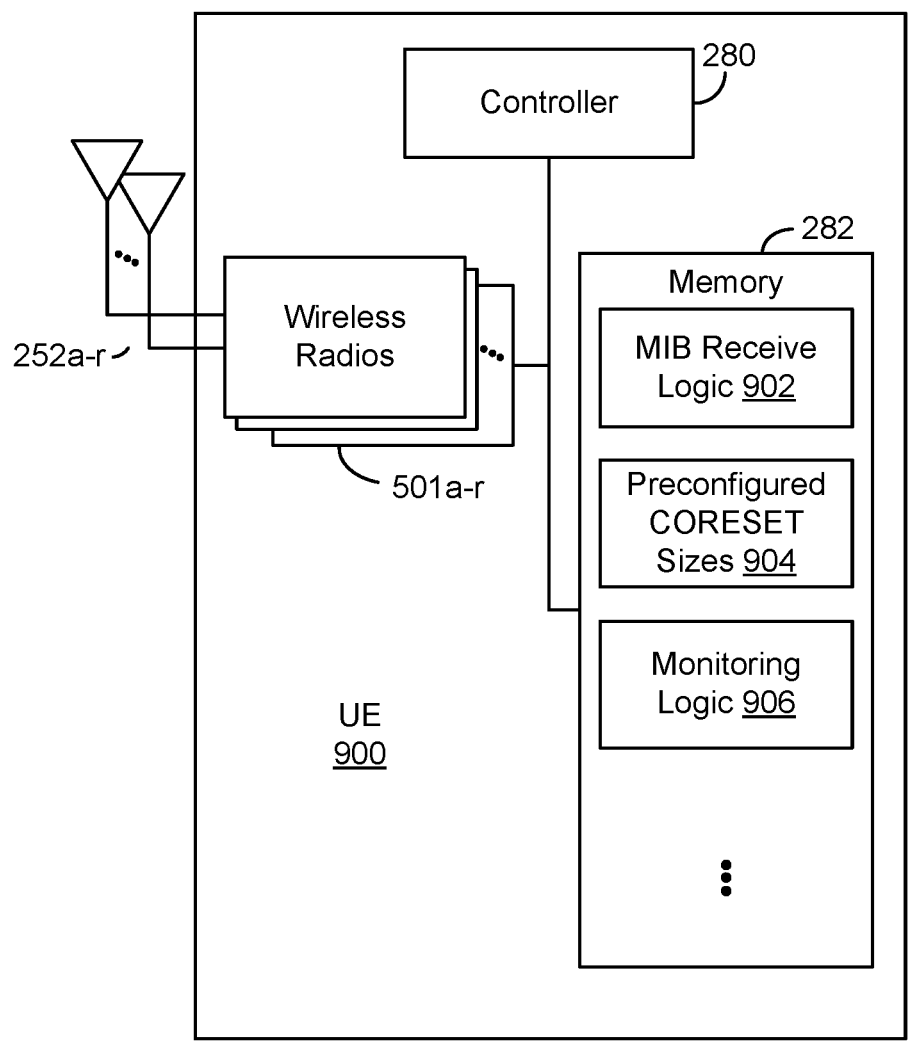
FIG. 9 is a block diagram of an example UE that supports allocating CORESETs for multiple types of devices according to one or more aspects.

FIG. 9 is a block diagram of an example UE 900 that supports allocating CORESETs for multiple types of devices according to one or more aspects. UE 900 may be configured to perform operations, including the blocks of a process described with reference to FIG. 8. In some implementations, UE 900 includes the structure, hardware, and components shown and described with reference to UE 115 of FIGS. 1, 2, and 4. For example, UE 900 includes controller 280, which operates to execute logic or computer instructions stored in memory 282, as well as controlling the components of UE 900 that provide the features and functionality of UE 900. UE 900, under control of controller 280, transmits and receives signals via wireless radios 901*a-r* and antennas 252*a-r*. Wireless radios 901*a-r* include various components and hardware, as illustrated in FIG. 2 for UE 115, including modulator and demodulators 254*a-r*, MIMO detector 256, receive processor 258, transmit processor 264, and TX MIMO processor 266.

Figure 11:
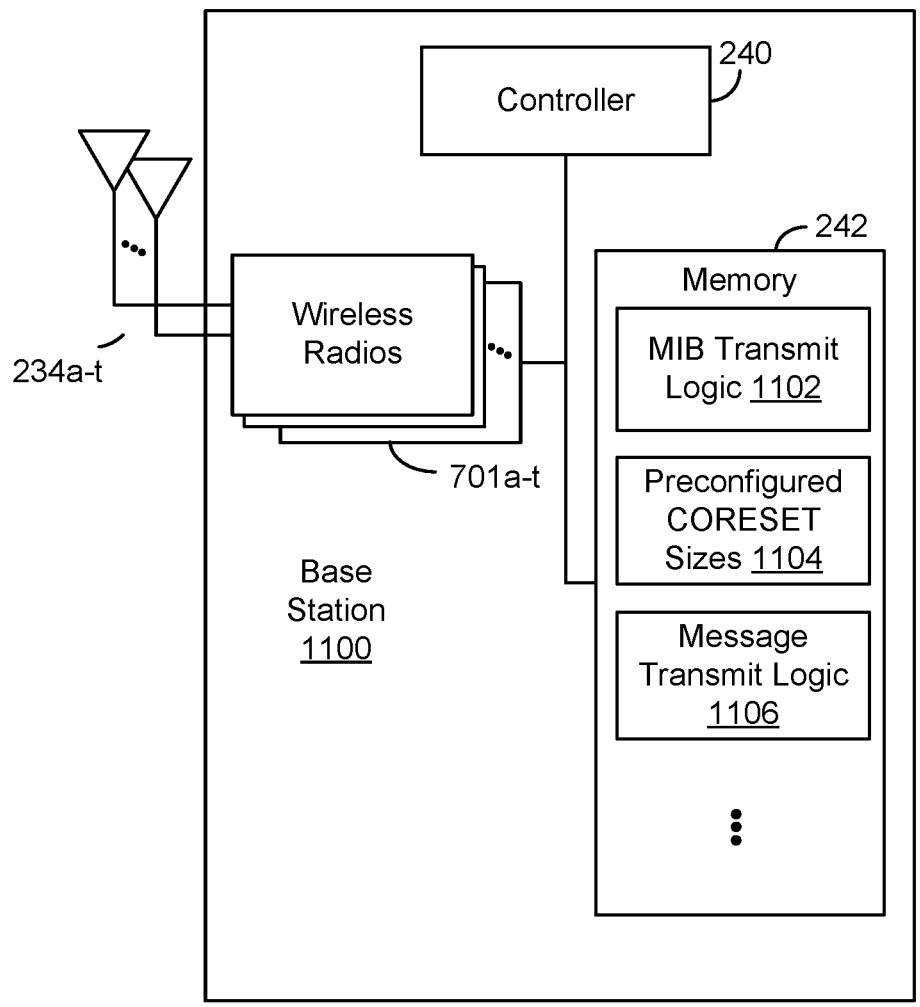
FIG. 11 is a block diagram of an example base station that supports allocating CORESETs for multiple types of devices according to one or more aspects.

As shown, memory 282 may include MIB receive logic 902, preconfigured CORESET sizes 904, and monitoring logic 906. The MIB receive logic 902 may be configured to receive, from a base station at a device having a first type (e.g., a reduced bandwidth device), an MIB that includes CORESET size information and search space information for devices having a second type (e.g., non-reduced bandwidth devices). The preconfigured CORESET sizes 904 may include multiple CORESET sizes for devices having the first type and corresponding to different values of one or more communication parameters, such as SCS values, as a non-limiting example. The monitoring logic 906 may be configured to monitor a set of time and frequency resources to receive a message from the base station. The set of time and frequency resources may have a size selected from among the preconfigured CORESET sizes 904. UE 900 may receive signals from or transmit signals to one or more network entities, such as base station 105 of FIGS. 1, 2, and 4 or a base station as illustrated in FIG. 11.

Figure 10:
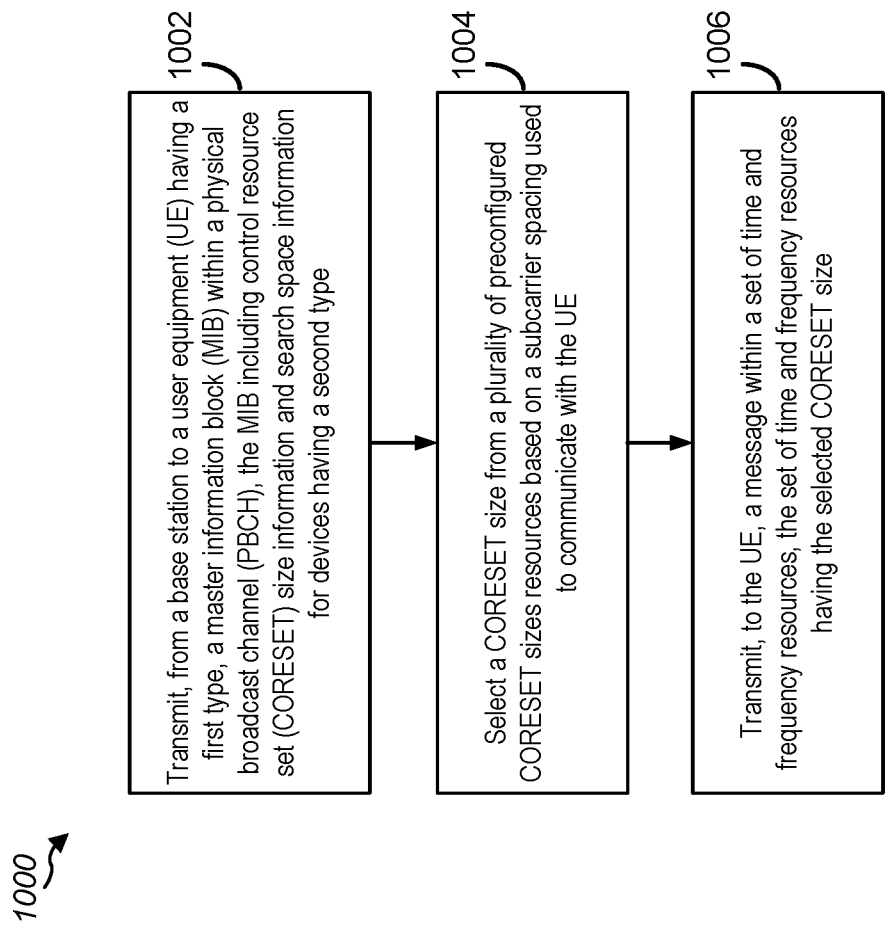
FIG. 10 is a flow diagram illustrating an example process that supports allocating CORESETs for multiple types of devices according to one or more aspects.

FIG. 10 is a flow diagram illustrating an example process 1000 that supports allocating CORESETs for multiple types of devices according to one or more aspects. Operations of process 1000 may be performed by a base station, such as base station 105 described above with reference to FIGS. 1, 2, and 4 or a base station as described above with reference to FIG. 11. For example, example operations of process 1000 may enable base station 105 to support allocation of CORESETs to multiple types of devices having different operating bandwidths.

At block 1002, the base station transmits, to a UE having a first type, a MIB within a PBCH. The MIB includes CORESET size information and search space information for devices having a second type. For example, the MIB may include or correspond to the MIB 470 of FIG. 4, the CORESET size information may include or correspond to the CORESET size information 472 of FIG. 4, and the search space information may include or correspond to the search space information 474 of FIG. 4. At block 1004, the base station selects a CORESET size from a plurality of preconfigured CORESET sizes based on a subcarrier spacing used to communicate with the UE. For example, the plurality of preconfigured CORESET sizes may include or correspond to the preconfigured CORESET sizes 462 of FIG. 4. In some implementations, the selected CORESET size is not included in the MIB. At block 1006, the base station transmits, to the UE, a message within a set of time and frequency resources. The set of time and frequency resources have the selected CORESET size. For example, the message may include or correspond to the message 480 of FIG. 4.

In some implementations, selecting the CORESET size includes selecting a first CORESET size of the plurality of preconfigured CORESET sizes based on the subcarrier spacing having a first SCS value and selecting a second CORESET size of the plurality of preconfigured CORESET sizes based on the subcarrier spacing having a second SCS value that is greater than the first SCS value. For example, with reference to FIG. 4, the base station 105 may select one of the preconfigured CORESET sizes 462 based on the SCS parameters 460. In some such implementations, the first CORESET size may include 24 PRBs in the frequency domain and 7 symbols in the time domain, and the first SCS value may include 15 kHz. Alternatively, the second CORESET size may include 12 PRBs in the frequency domain and 14 symbols in the time domain, and the first SCS value may include 30 kHz.

In some implementations, the process 1000 may further include determining a SSB frequency offset for the set of time and frequency resources based at least in part on a SSB frequency offset for devices having the second type that is included in the MIB and the PBCH. A frequency location of the set of time and frequency resources may be based on the SSB frequency offset. For example, the SSB frequency offset for the set of time and frequency resources may be selected based on the SSB frequency offset 476 of FIG. 4. In some such implementations, the SSB frequency offset is the same as the SSB frequency offset for devices having the second type. Alternatively, the SSB frequency offset includes a sum of the SSB frequency offset for devices having the second type and an additional offset value that is based on the SSB frequency offset for devices having the second type. For example, the SSB frequency offset may include a sum of the SSB frequency offset 476 and one of the preconfigured additional SSB offsets 466.

In some implementations, the MIB and the PBCH include an indicator of search space information for devices having the first type. For example, the indicator may include or correspond to the search space indicator 478 of FIG. 4. In some such implementations, the indicator may include one or more reserved bits of the PBCH, the MIB, or both. For example, the one or more reserved bits may include the reserved bits 304 of FIG. 3, the reserved bit 312 of FIG. 3, or a combination thereof. Additionally or alternatively, a value of the indicator may correspond to one of a plurality of preconfigured monitoring patterns for the set of time and frequency resources and a repetition number associated with a number of slots to be monitored. Each preconfigured monitoring pattern may be associated with a subset of SFNs and a starting slot. For example, the preconfigured monitoring patterns and the repetition number may include or correspond to the monitoring patterns and the repetition number represented by the table 700 of FIG. 7.

In some implementations, the message transmitted via the set of time and frequency resources may include a RRC message that indicates configuration parameters corresponding to a PDSCH, and the base station may transmit downlink data to the UE via a second set of time and frequency resources in accordance with the configuration parameters. For example, the configuration parameters may include or correspond to the PDSCH configuration parameters 482 of FIG. 4.

FIG. 11 is a block diagram of an example base station 1100 that supports allocating CORESETs for multiple types of devices according to one or more aspects. Base station 1100 may be configured to perform operations, including the blocks of process 1000 described with reference to FIG. 10. In some implementations, base station 1100 includes the structure, hardware, and components shown and described with reference to base station 105 of FIGS. 1, 2, and 4. For example, base station 1100 may include controller 240, which operates to execute logic or computer instructions stored in memory 242, as well as controlling the components of base station 1100 that provide the features and functionality of base station 1100. Base station 1100, under control of controller 240, transmits and receives signals via wireless radios 1101*a-t* and antennas 1134*a-t*. Wireless radios 1101*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include MIB transmit logic 1102, preconfigured CORESET sizes 1104, and message transmit logic 1106. The MIB transmit logic 1102 may be configured to transmit an MIB that includes CORESET size information and search space information for devices having a second type (e.g., non-reduced bandwidth devices). The preconfigured CORESET sizes 1104 may include multiple CORESET sizes for devices having a first type (e.g., reduced bandwidth devices) and that each correspond to different values of one or more communication parameters, such as SCS values as a non-limiting example. The message transmit logic 1106 may be configured to transmit, to a UE having the first type, a message within a set of time and of time and frequency resources that have a size selected from among the preconfigured CORESET sizes 1104. Base station 1100 may receive signals from or transmit signals to one or more UEs, such as UE 115 of FIGS. 1, 2, and 4 or UE 900 of FIG. 9.

It is noted that one or more blocks (or operations) described with reference to FIGS. 8 and 10 may be combined with one or more blocks (or operations) described with reference to another of the figures. For example, one or more blocks (or operations) of FIG. 8 may be combined with one or more blocks (or operations) of FIG. 10. As another example, one or more blocks associated with FIGS. 8 and 10 may be combined with one or more blocks (or operations) associated with FIGS. 1, 2, and 4. Additionally, or alternatively, one or more operations described above with reference to FIGS. 1, 2, and 4 may be combined with one or more operations described with reference to FIG. 9 or 11.

In one or more aspects, techniques for supporting allocation of CORESETs for multiple types of devices using the same signaling (e.g., one RRC message, such as an MIB) may include additional aspects, such as any single aspect or any combination of aspects described below or in connection with one or more other processes or devices described elsewhere herein. In a first aspect, supporting allocation of CORESETs for multiple types of devices using the same signaling may include an apparatus configured to receive, from a base station at a UE having a first type, a MIB within a PBCH. The MIB includes CORESET size information and search space information for devices having a second type. The apparatus is also configured to select a CORESET size from a plurality of preconfigured CORESET sizes based on a subcarrier spacing used to communicate with the base station. The apparatus is further configured to monitor a set of time and frequency resources to receive a message from the base station. The set of time and frequency resources have the selected CORESET size. Additionally, the apparatus may perform or operate according to one or more aspects as described below. In some implementations, the apparatus includes a wireless device, such as a UE (e.g., the UE having the first type). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the selected CORESET size is different than the CORESET size information for devices having the second type.

In a third aspect, in combination with one or more of the first aspect or the second aspect, selecting the CORESET size includes selecting a first CORESET size of the plurality of preconfigured CORESET sizes based on the subcarrier spacing having a first SCS value and selecting a second CORESET size of the plurality of preconfigured CORESET sizes based on the subcarrier spacing having a second SCS value that is greater than the first SCS value.

In a fourth aspect, in combination with the third aspect, the first CORESET size includes 24 PRBs in the frequency domain and 7 symbols in the time domain, and the first SCS value includes 15 KHz.

In a fifth aspect, in combination with the third aspect, the second CORESET size includes 12 PRBs in the frequency domain and 14 symbols in the time domain, and the first SCS value includes 30 KHz.

In a sixth aspect, in combination with one or more of the first aspect through the fifth aspect, the apparatus determines an SSB frequency offset for the set of time and frequency resources based at least in part on an SSB frequency offset for devices having the second type that is included in the MIB and the PBCH. A frequency location of the set of time and frequency resources is based on the SSB frequency offset.

In a seventh aspect, in combination with the sixth aspect, the SSB frequency offset is the same as the SSB frequency offset for devices having the second type.

In an eighth aspect, in combination with the sixth aspect, the SSB frequency offset includes a sum of the SSB frequency offset for devices having the second type and an additional offset value that is based on the SSB frequency offset for devices having the second type.

In a ninth aspect, in combination with the eighth aspect, selecting the additional offset value includes selecting a first offset value based on the SSB frequency offset for devices having the second type being less than a first threshold.

In a tenth aspect, in combination with the ninth aspect, selecting the additional offset value includes selecting a second offset value based on the SSB frequency offset for devices having the second type being greater than or equal to the first threshold and less than a second threshold.

In an eleventh aspect, in combination with the tenth aspect, selecting the additional offset value includes selecting a third offset value based on the SSB frequency offset for devices having the second type being greater than or equal to the second threshold.

In a twelfth aspect, in combination with one or more of the first aspect through the eleventh aspect, the message received via the set of time and frequency resources includes a RRC message that indicates configuration parameters corresponding to a PDSCH. The apparatus monitors a second set of time and frequency resources in accordance with the configuration parameters to receive downlink data from the base station.

In a thirteenth aspect, in combination with one or more of the first aspect through the twelfth aspect, the apparatus communicates with the base station via a bandwidth that is less than 20 MHz, and the CORESET size information and the search space information for devices having the second type does not support less than 20 MHz operation.

In a fourteenth aspect, in combination with one or more of the first aspect through the thirteenth aspect, the CORESET size corresponds to CORESET0 (e.g., an initial CORESET of a plurality of preconfigured CORESETs).

In a fifteenth aspect, in combination with one or more of the first aspect through the fourteenth aspect, the MIB and the PBCH include an indicator of search space information for devices having the first type.

In a sixteenth aspect, in combination with the fifteenth aspect, the indicator of the search space information for devices having the first type includes one or more reserved bits of the PBCH, the MIB, or both.

In a seventeenth aspect, in combination with the sixteenth aspect, the one or more reserved bits include a plurality of reserved bits of a PHY layer of the PBCH and a reserved bit of the MIB.

In an eighteenth aspect, in combination with one or more of the fifteenth aspect through the seventeenth aspect, a value of the indicator corresponds to one of a plurality of preconfigured monitoring patterns for the set of time and frequency resources and a starting slot and a repetition number associated with a number of slots to be monitored. Each preconfigured monitoring pattern is associated with a subset of SFNs.

In one or more aspects, techniques for supporting allocation of CORESETs for multiple types of devices using the same signaling (e.g., one RRC message, such as an MIB) may include additional aspects, such as any single aspect or any combination of aspects described below or in connection with one or more other processes or devices described elsewhere herein. In a nineteenth aspect, supporting allocation of CORESETs for multiple types of devices using the same signaling may include an apparatus configured to transmit, to a UE having a first type, a MIB within a PBCH. The MIB includes CORESET size information and search space information for devices having a second type. The apparatus is also configured to select a CORESET size from a plurality of preconfigured CORESET sizes based on a subcarrier spacing used to communicate with the UE. The apparatus is further configured to transmit, to the UE, a message within a set of time and frequency resources. The set of time and frequency resources have the selected CORESET size. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twentieth aspect, in combination with the nineteenth aspect, the selected CORESET size is not included in the MIB.

In a twenty-first aspect, in combination with the nineteenth aspect or the twentieth aspect, selecting the CORESET size includes selecting a first CORESET size of the plurality of preconfigured CORESET sizes based on the subcarrier spacing having a first SCS value and selecting a second CORESET size of the plurality of preconfigured CORESET sizes based on the subcarrier spacing having a second SCS value that is greater than the first SCS value.

In twenty-second aspect, in combination with the twenty-first aspect, the first CORESET size includes 24 PRBs in the frequency domain and 7 symbols in the time domain, and the first SCS value includes 15 KHz.

In twenty-third aspect, in combination with the twenty-first aspect, the second CORESET size includes 12 PRBs in the frequency domain and 14 symbols in the time domain, and the first SCS value includes 30 KHz.

In twenty-fourth aspect, in combination with one or more of the nineteenth aspect through the twenty-third aspect, the apparatus determines a SSB frequency offset for the set of time and frequency resources based at least in part on a SSB frequency offset for devices having the second type that is included in the MIB and the PBCH. A frequency location of the set of time and frequency resources is based on the SSB frequency offset.

In twenty-fifth aspect, in combination with the twenty-fourth aspect, the SSB frequency offset is the same as the SSB frequency offset for devices having the second type.

In twenty-sixth aspect, in combination with the twenty-fourth aspect, the SSB frequency offset includes a sum of the SSB frequency offset for devices having the second type and an additional offset value that is based on the SSB frequency offset for devices having the second type.

In twenty-seventh aspect, in combination with one or more of the nineteenth aspect through the twenty-sixth aspect, the MIB and the PBCH include an indicator of search space information for devices having the first type.

In twenty-eighth aspect, in combination with the twenty-seventh aspect, the indicator includes one or more reserved bits of the PBCH, the MIB, or both.

In twenty-ninth aspect, in combination with one or more of the twenty-seventh aspect through the twenty-eighth aspect, a value of the indicator corresponds to one of a plurality of preconfigured monitoring patterns for the set of time and frequency resources and a repetition number associated with a number of slots to be monitored. Each preconfigured monitoring pattern is associated with a subset of SFNs and a starting slot.

In thirtieth aspect, in combination with one or more of the nineteenth aspect through the twenty-ninth aspect, the message transmitted via the set of time and frequency resources includes a RRC message that indicates configuration parameters corresponding to a PDSCH, and the apparatus transmits downlink data to the UE via a second set of time and frequency resources in accordance with the configuration parameters.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
   receiving, from a base station at a user equipment (UE) having a first type, a master information block (MIB) within a physical broadcast channel (PBCH), the MIB including control resource set (CORESET) size information and search space information for devices having a second type;
   selecting a CORESET size from a plurality of preconfigured CORESET sizes based on a subcarrier spacing used to communicate with the base station; and
   monitoring a set of time and frequency resources to receive a message from the base station, the set of time and frequency resources having the selected CORESET size.

2. The method of claim 1, wherein the selected CORESET size is different than the CORESET size information for devices having the second type.

3. The method of claim 1, wherein selecting the CORESET size comprises:
   selecting a first CORESET size of the plurality of preconfigured CORESET sizes based on the subcarrier spacing having a first subcarrier spacing (SCS) value; and
   selecting a second CORESET size of the plurality of preconfigured CORESET sizes based on the subcarrier spacing having a second SCS value that is greater than the first SCS value.

4. The method of claim 3, wherein the first CORESET size comprises 24 physical resource blocks (PRBs) in the frequency domain and 7 symbols in the time domain, and wherein the first SCS value comprises 15 kilohertz (kHz).

5. The method of claim 3, wherein the second CORESET size comprises 12 physical resource blocks (PRBs) in the frequency domain and 14 symbols in the time domain, and wherein the first SCS value comprises 30 kilohertz (kHz).

6. The method of claim 1, further comprising determining a synchronization signal block (SSB) frequency offset for the set of time and frequency resources based at least in part on a SSB frequency offset for devices having the second type that is included in the MIB and the PBCH, wherein a frequency location of the set of time and frequency resources is based on the SSB frequency offset.

7. The method of claim 6, wherein the SSB frequency offset is the same as the SSB frequency offset for devices having the second type.

8. The method of claim 6, wherein the SSB frequency offset comprises a sum of the SSB frequency offset for devices having the second type and an additional offset value that is based on the SSB frequency offset for devices having the second type.

9. The method of claim 8, wherein selecting the additional offset value comprises:
   selecting a first offset value based on the SSB frequency offset for devices having the second type being less than a first threshold;
   selecting a second offset value based on the SSB frequency offset for devices having the second type being greater than or equal to the first threshold and less than a second threshold; and
   selecting a third offset value based on the SSB frequency offset for devices having the second type being greater than or equal to the second threshold.

10. The method of claim 1, wherein the message received via the set of time and frequency resources comprises a radio resource control (RRC) message that indicates configuration parameters corresponding to a physical downlink shared channel (PDSCH), and further comprising monitoring a second set of time and frequency resources in accordance with the configuration parameters to receive downlink data from the base station.

11. An apparatus for wireless communication, the apparatus comprising:
   at least one processor; and
   a memory coupled to the at least one processor, wherein the at least one processor is configured to:
      receive, from a base station at a user equipment (UE) having a first type, a master information block (MIB) within a physical broadcast channel (PBCH), the MIB including control resource set (CORESET) size information and search space information for devices having a second type;
      select a CORESET size from a plurality of preconfigured CORESET sizes based on a subcarrier spacing used to communicate with the base station; and
      monitor a set of time and frequency resources to receive a message from the base station, the set of time and frequency resources having the selected CORESET size.

12. The apparatus of claim 11, wherein:
   the at least one processor is configured to communicate with the base station via a bandwidth (BW) that is less than 20 megahertz (MHz), and
   the CORESET size information and the search space information for devices having the second type does not support less than 20 MHz operation.

13. The apparatus of claim 11, wherein the CORESET size corresponds to an initial CORESET (CORESET0) of a plurality of preconfigured CORESETs.

14. The apparatus of claim 11, wherein the MIB and the PBCH include an indicator of search space information for devices having the first type.

15. The apparatus of claim 14, wherein the indicator of the search space information for devices having the first type comprises one or more reserved bits of the PBCH, the MIB, or both.

16. The apparatus of claim 15, wherein the one or more reserved bits comprise a plurality of reserved bits of a physical (PHY) layer of the PBCH and a reserved bit of the MIB.

17. The apparatus of claim 14, wherein a value of the indicator corresponds to:
   one of a plurality of preconfigured monitoring patterns for the set of time and frequency resources, each preconfigured monitoring pattern associated with a subset of system frame numbers (SFNs) and a starting slot; and
   a repetition number associated with a number of slots to be monitored.

18. A method of wireless communication, the method comprising:
   transmitting, from a base station to a user equipment (UE) having a first type, a master information block (MIB) within a physical broadcast channel (PBCH), the MIB including control resource set (CORESET) size information and search space information for devices having a second type;

selecting a CORESET size from a plurality of preconfigured CORESET sizes based on a subcarrier spacing used to communicate with the UE; and transmitting, to the UE, a message within a set of time and frequency resources, the set of time and frequency resources having the selected CORESET size.

19. The method of claim 18, wherein the selected CORESET size is not included in the MIB.

20. The method of claim 18, wherein selecting the CORESET size comprises:

selecting a first CORESET size of the plurality of preconfigured CORESET sizes based on the subcarrier spacing having a first subcarrier spacing (SCS) value; and selecting a second CORESET size of the plurality of preconfigured CORESET sizes based on the subcarrier spacing having a second SCS value that is greater than the first SCS value.

21. The method of claim 20, wherein the first CORESET size comprises 24 physical resource blocks (PRBs) in the frequency domain and 7 symbols in the time domain, and wherein the first SCS value comprises 15 kilohertz (kHz).

22. The method of claim 20, wherein the second CORESET size comprises 12 physical resource blocks (PRBs) in the frequency domain and 14 symbols in the time domain, and wherein the first SCS value comprises 30 kilohertz (kHz).

23. The method of claim 18, further comprising determining a synchronization signal block (SSB) frequency offset for the set of time and frequency resources based at least in part on a SSB frequency offset for devices having the second type that is included in the MIB and the PBCH, wherein a frequency location of the set of time and frequency resources is based on the SSB frequency offset.

24. The method of claim 23, wherein the SSB frequency offset is the same as the SSB frequency offset for devices having the second type.

25. The method of claim 23, wherein the SSB frequency offset comprises a sum of the SSB frequency offset for devices having the second type and an additional offset value that is based on the SSB frequency offset for devices having the second type.

26. An apparatus for wireless communication, the apparatus comprising:

at least one processor; and a memory coupled to the at least one processor, wherein the at least one processor is configured to:

initiate transmission, to a user equipment (UE) having a first type, of a master information block (MIB) within a physical broadcast channel (PBCH), the MIB including control resource set (CORESET) size information and search space information for devices having a second type;

select a CORESET size from a plurality of preconfigured CORESET sizes based on a subcarrier spacing used to communicate with the UE; and initiate transmission, to the UE, of a message within a set of time and frequency resources, the set of time and frequency resources having the selected CORESET size.

27. The apparatus of claim 26, wherein the MIB and the PBCH include an indicator of search space information for devices having the first type.

28. The apparatus of claim 27, wherein the indicator comprises one or more reserved bits of the PBCH, the MIB, or both.

29. The apparatus of claim 27, wherein a value of the indicator corresponds to one of a plurality of preconfigured monitoring patterns for the set of time and frequency resources and a repetition number associated with a number of slots to be monitored, each preconfigured monitoring pattern associated with a subset of system frame numbers (SFNs) and a starting slot.

30. The apparatus of claim 26, wherein:

the message transmitted via the set of time and frequency resources comprises a radio resource control (RRC) message that indicates configuration parameters corresponding to a physical downlink shared channel (PDSCH), and the at least one processor is further configured to initiate transmission of downlink data to the UE via a second set of time and frequency resources in accordance with the configuration parameters.

* * * * *